(12) United States Patent
Ueda et al.

(10) Patent No.: US 8,166,556 B2
(45) Date of Patent: Apr. 24, 2012

(54) INFORMATION PROCESSING APPARATUS, INFORMATION RECORDING MEDIUM, INFORMATION PROCESSING METHOD AND COMPUTER PROGRAM

(75) Inventors: Kenjiro Ueda, Kanagawa (JP); Jun Yonemitsu, Kanagawa (JP); Yoshiyuki Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 1173 days.

(21) Appl. No.: 11/937,702

(22) Filed: Nov. 9, 2007

(65) Prior Publication Data

US 2008/0134340 A1   Jun. 5, 2008

(30) Foreign Application Priority Data

Nov. 30, 2006   (JP) .................................. 2006-323902

(51) Int. Cl.
 *G06F 7/04* (2006.01)
 *G06F 21/00* (2006.01)
(52) U.S. Cl. .......................................... 726/26; 705/57
(58) Field of Classification Search .......... 709/201–203, 709/217–219, 223–230
See application file for complete search history.

(56) References Cited

U.S. PATENT DOCUMENTS

| | | | | |
|---|---|---|---|---|
| 6,662,231 | B1 * | 12/2003 | Drosset et al. ................. | 709/229 |
| 7,088,822 | B2 * | 8/2006 | Asano ............................. | 380/45 |
| 7,792,865 | B2 * | 9/2010 | Hamada et al. ................ | 707/796 |
| 7,827,401 | B2 * | 11/2010 | Micali ........................... | 713/158 |
| 2002/0026581 | A1 * | 2/2002 | Matsuyama et al. .......... | 713/168 |
| 2007/0061584 | A1 * | 3/2007 | Takashima et al. ........... | 713/176 |

FOREIGN PATENT DOCUMENTS

| | | |
|---|---|---|
| JP | 3087791 | 7/2000 |
| JP | 2002-135243 | 5/2002 |
| JP | 2003-323181 | 11/2003 |
| JP | 2005-122365 | 5/2005 |
| JP | 2006-74421 | 3/2006 |
| WO | WO 2005/071678 A1 | 8/2005 |

OTHER PUBLICATIONS

U.S. Appl. No. 12/056,634, filed Mar. 27, 2008, Hatanaka, et al.

* cited by examiner

*Primary Examiner* — Nathan Flynn
*Assistant Examiner* — Abdullah Almamun
(74) *Attorney, Agent, or Firm* — Oblon, Spivak, McClelland, Maier & Neustadt, L.L.P.

(57) ABSTRACT

An information processing apparatus that obtains pieces of content information relating to content recorded in an information recording medium, the information processing apparatus includes a data analyzing unit configured to read a content certificate which is recorded in the information recording medium and which corresponds to the content recorded in the information recording medium, a data transmitting unit configured to transmit a content certificate identifier analyzed using the data analyzing unit to a content information provision server, a data receiving unit configured to receive, from the content information provision server, the pieces of content information relating to the content which is specified on the bases of the content certification identifier, and a data outputting unit configured to output the pieces of content information received using the data receiving unit.

20 Claims, 18 Drawing Sheets

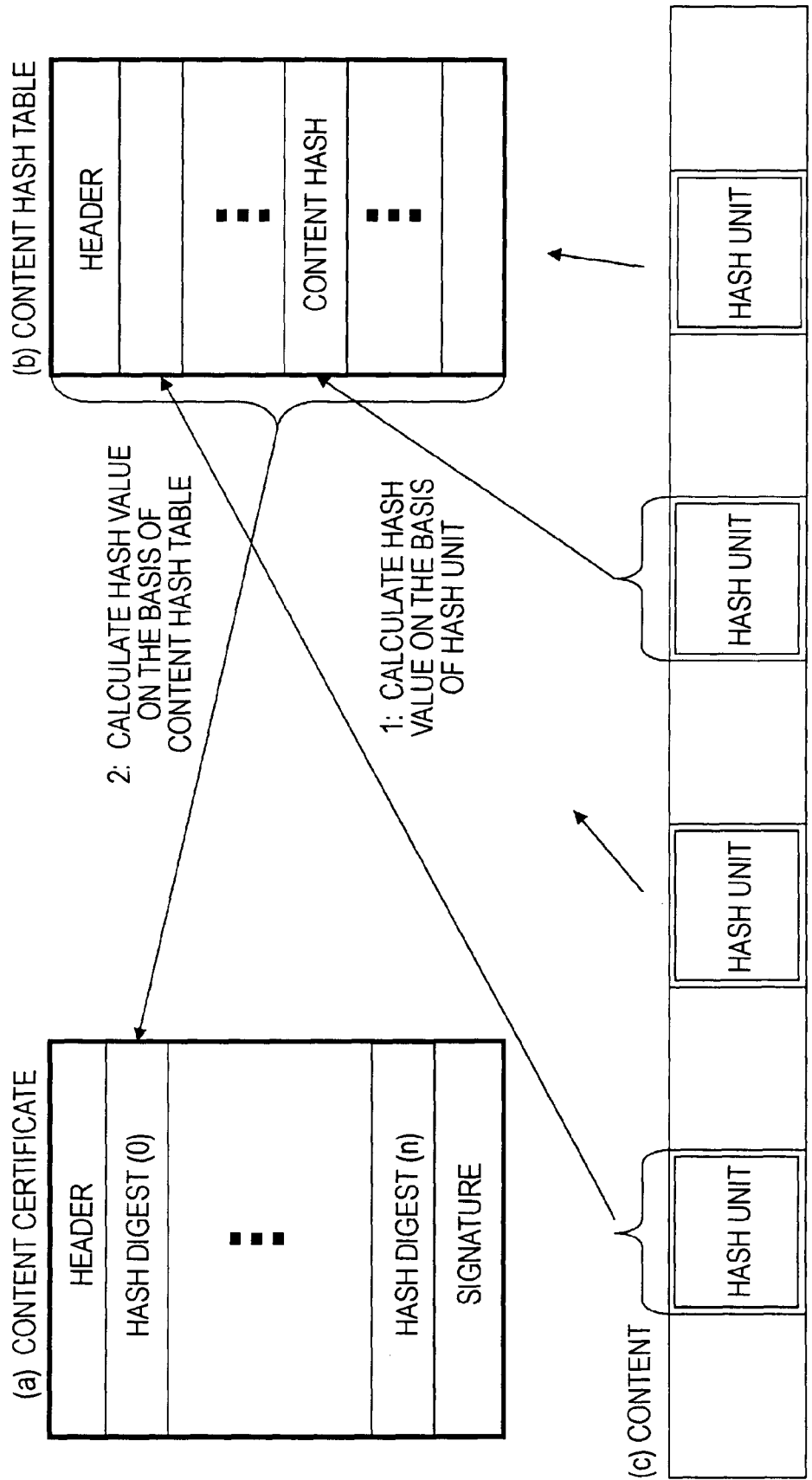

FIG. 5

Syntax:

| | | |
|---|---|---|
| — | Certificate Type | 1B |
| — | Total_Number_of_HashUnits | 4B |
| — | Total_Number_of_Layers | 1B |
| — | Layer_Number | 1B |
| — | Number_of_HashUnits | 4B |
| — | Number_of_Digests | 2B |
| — | Applicant ID | 2B |
| — | Content Sequence Number | 4B |
| — | Minimum CRL Version | 2B |
| — | Length_Format_Specific_Section | 2B |
| — | Hash_Value_of_MC_Manifest_File | 20B |
| — | Hash_Value_of_BDJ_Root_Cert | 20B |
| — | Num_of_CPS_Unit | 2B |
| — | Hash_Value_of_CPS_Unit_Usage_File | 20B |
| — | Content Hash Table Digest | 8B |
| — | Signature Data | 40B |

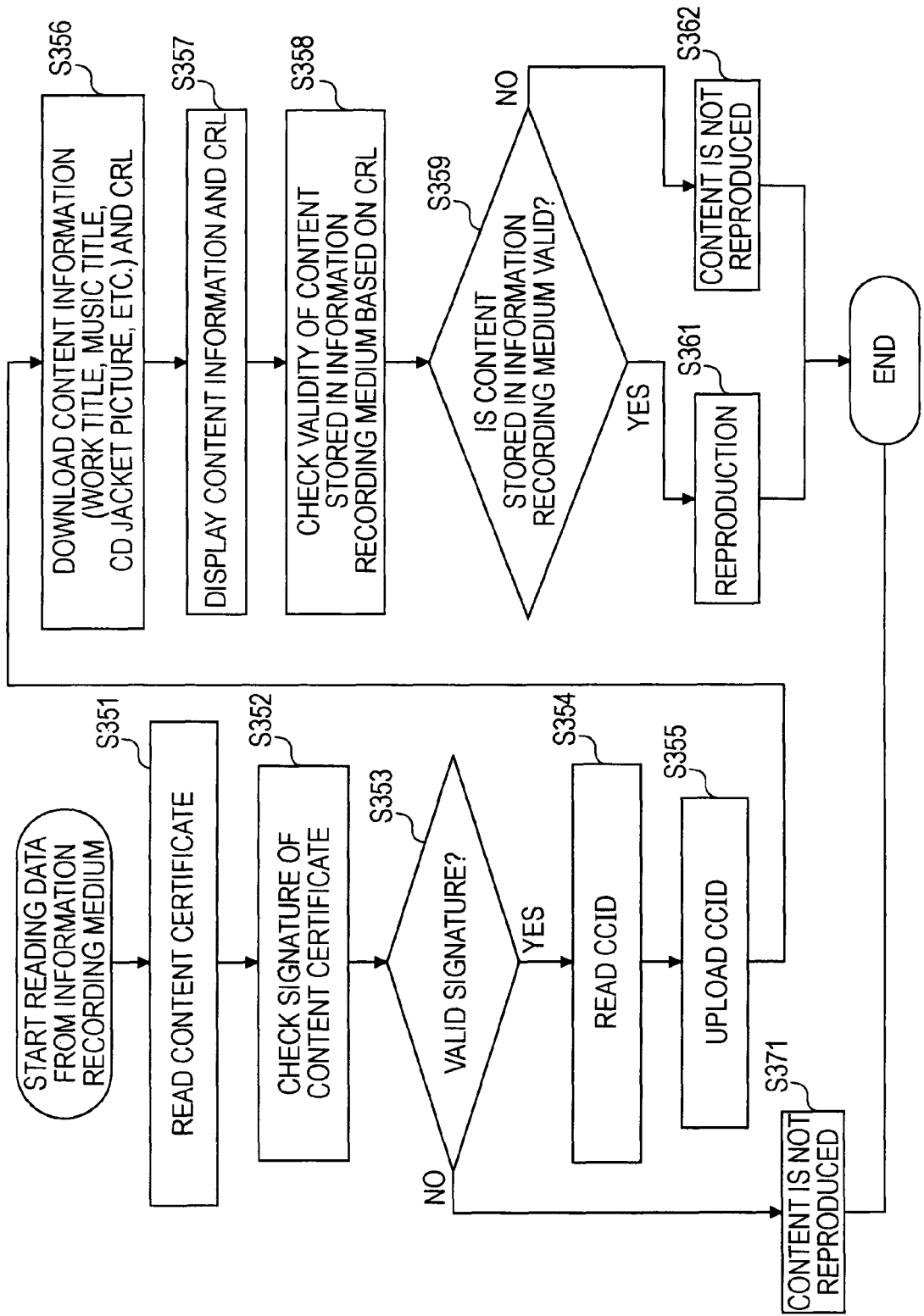

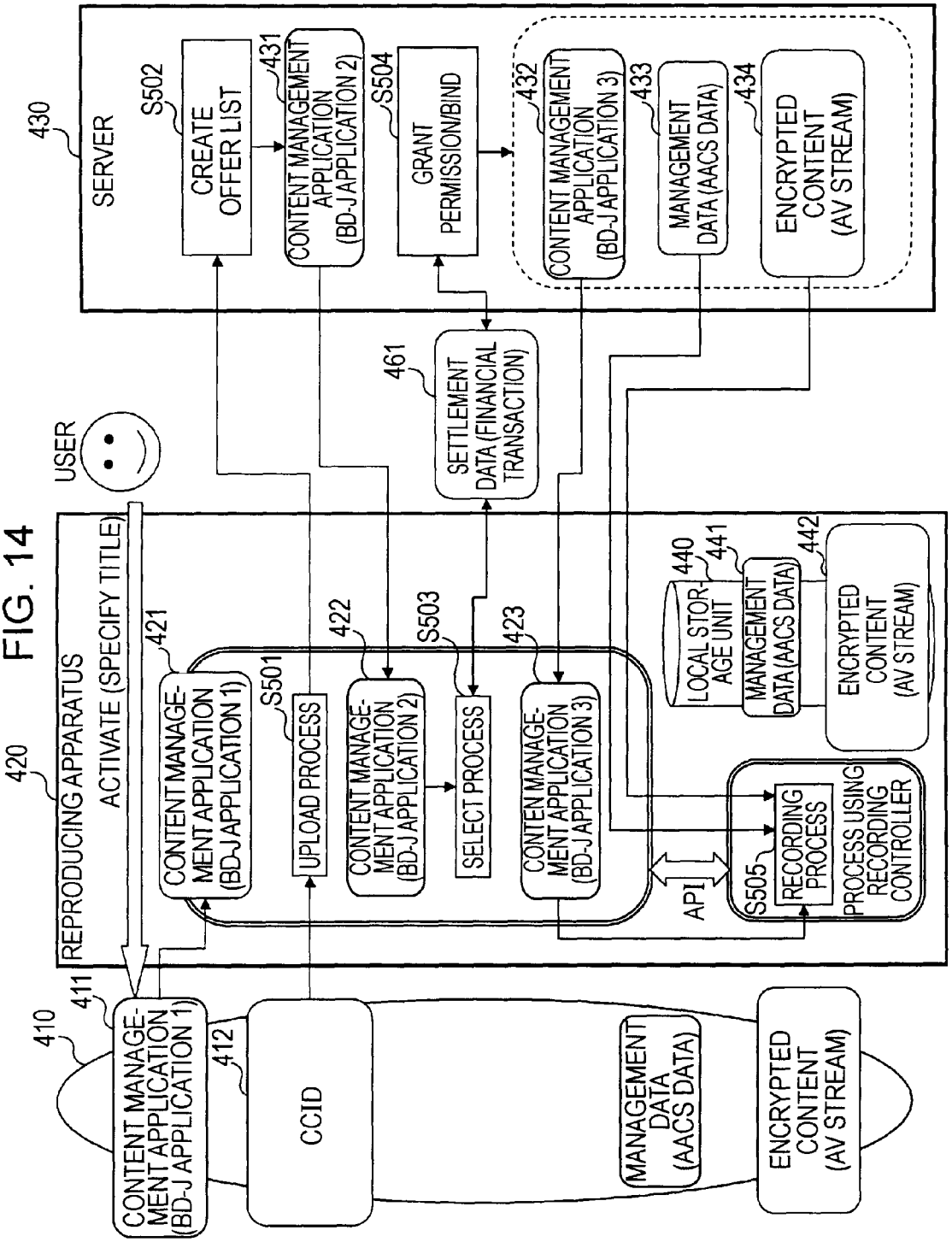

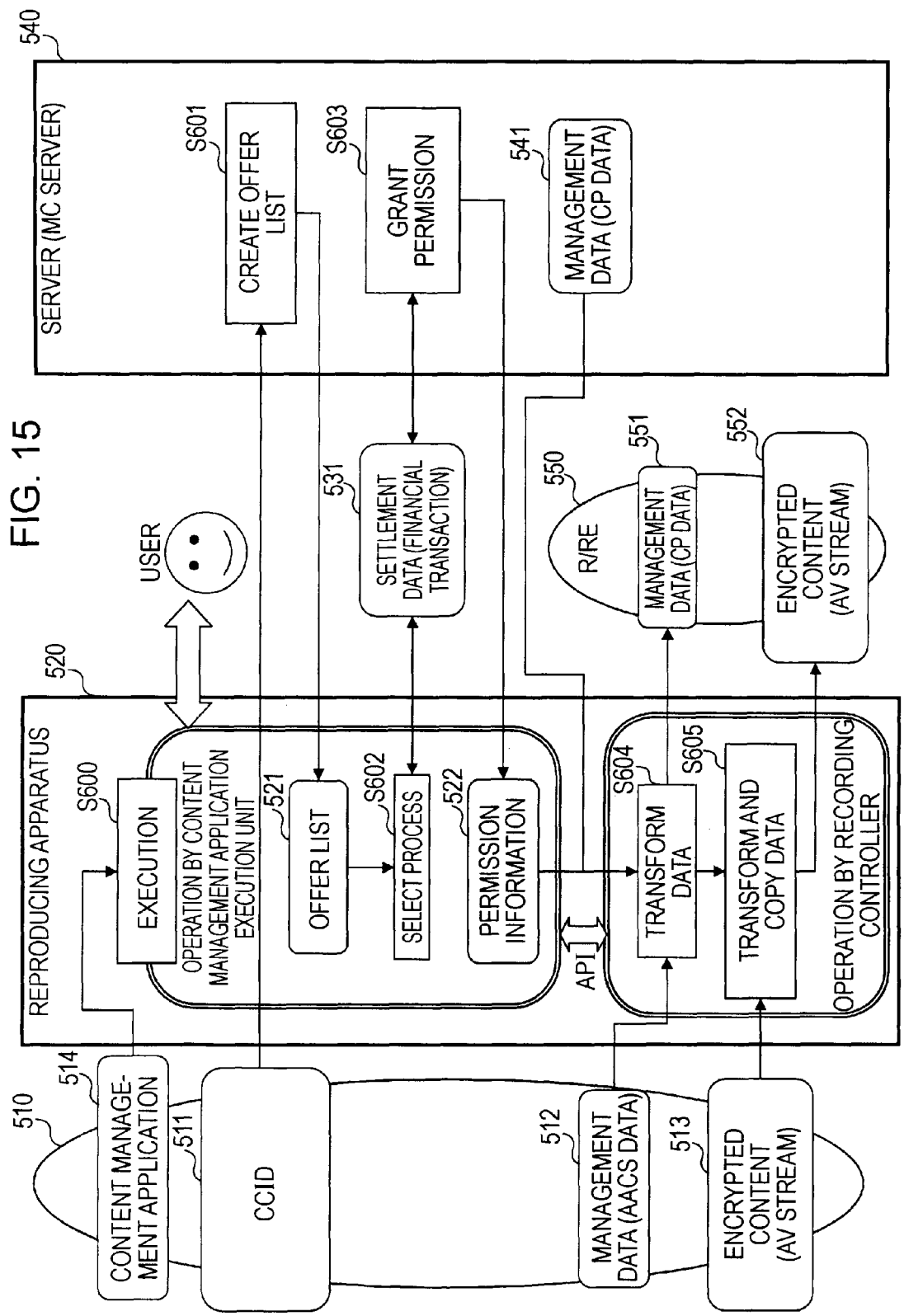

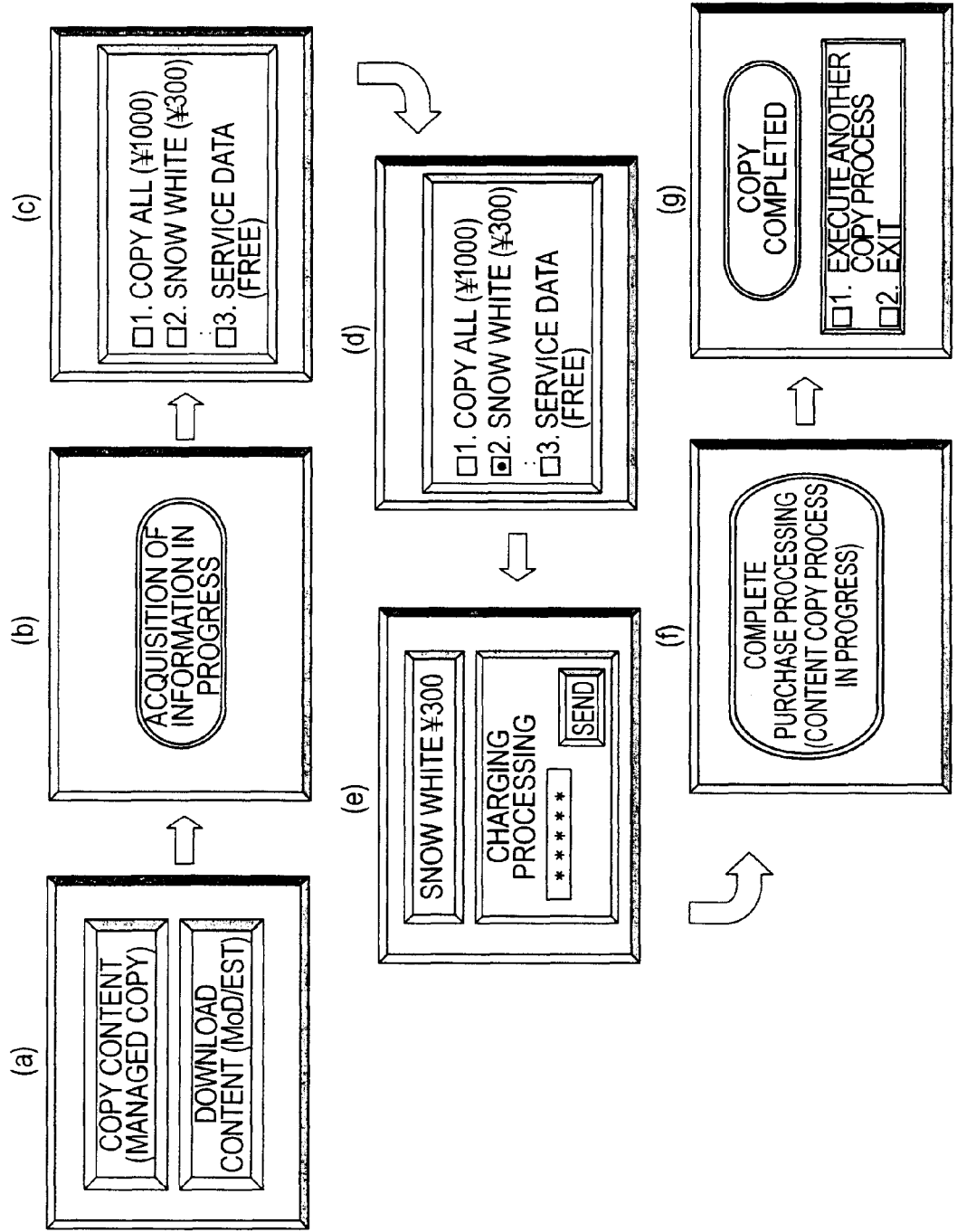

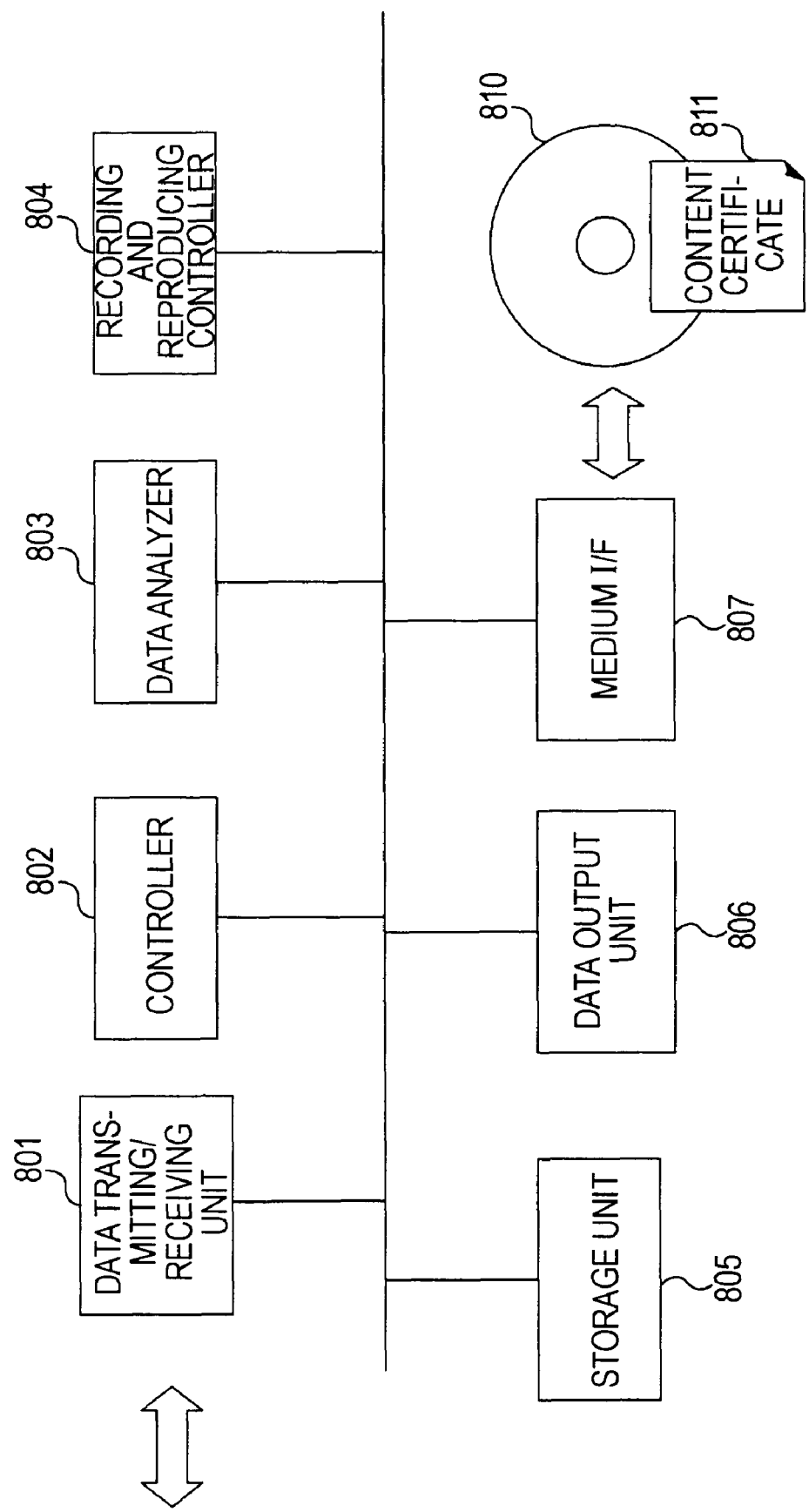

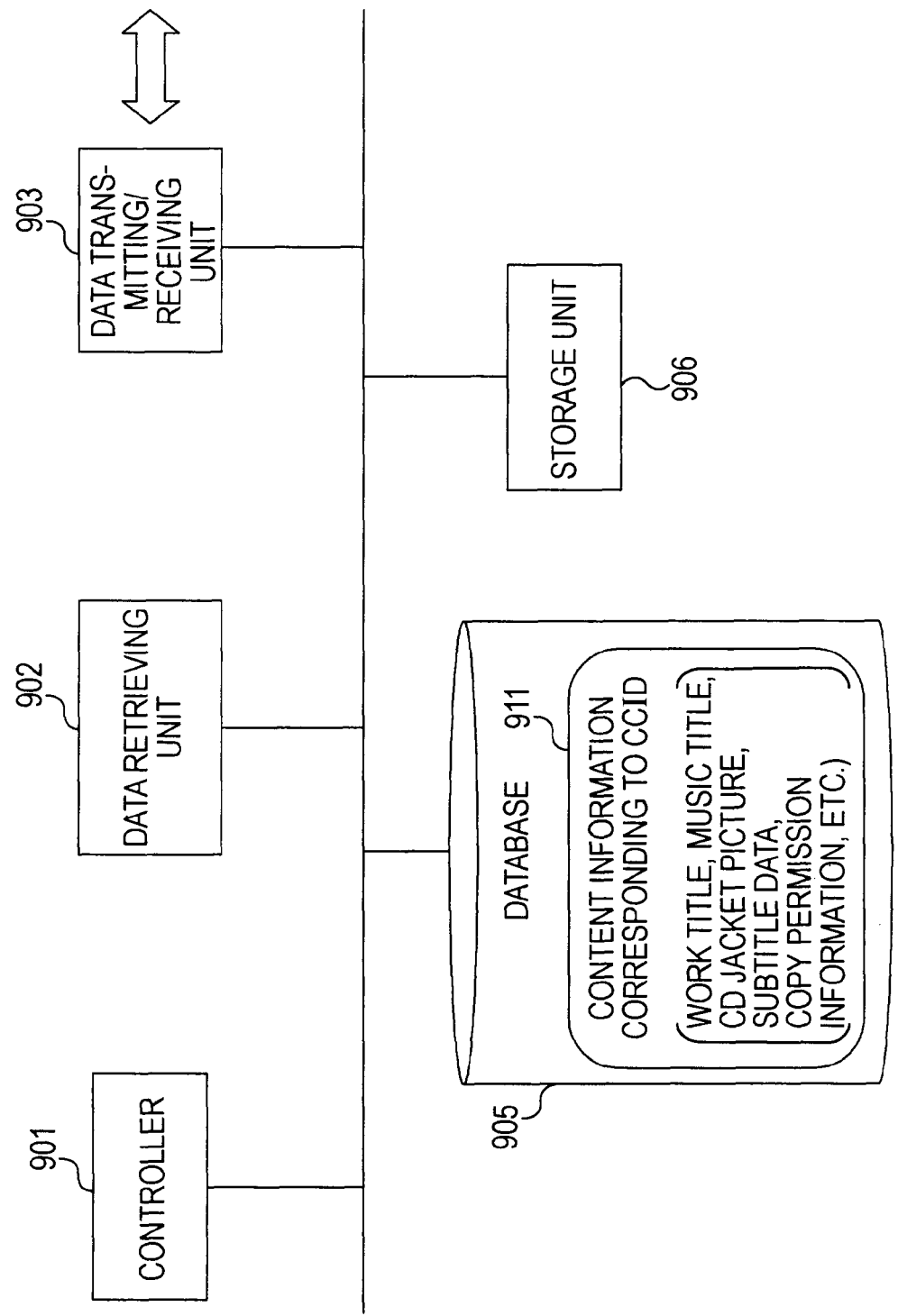

INFORMATION PROCESSING APPARATUS, INFORMATION RECORDING MEDIUM, INFORMATION PROCESSING METHOD AND COMPUTER PROGRAM

CROSS REFERENCES TO RELATED APPLICATIONS

The present invention contains subject matter related to Japanese Patent Application JP 2006-323902 filed in the Japanese Patent Office on Nov. 30, 2006, the entire contents of which are incorporated herein by reference.

BACKGROUND OF THE INVENTION

1. Field of the Invention

The present invention relates to information processing apparatuses, information recording media, information processing methods, and computer programs. Particularly, the present invention relates to an information processing apparatus which performs processing of obtaining content information, such as a music title and a work title, which corresponds to content stored in an information recording medium, and relates to the information recording medium, an information processing method, and a computer program.

2. Description of the Related Art

In recent years, a service for obtaining information on a title of music stored in a CD (Compact Disc), for example, from an external server connected via a network has been utilized. In this service, for example, TOC (table of contents) information, which is so-called content information recorded in advance in a music CD, may be transmitted to a server, and the server may provide for users with content information such as a music title which has been registered in accordance with the TOC. Note that, as the related art, Japanese Patent No. 3104628 discloses a configuration for obtaining content information on the basis of information recorded on a disc.

In recent years, DVDs (Digital Versatile Discs) and BDs (Blu-ray Discs: registered trademark) have been used as recording media for recording content such as music and movies. Such DVDs and BDs can store a large amount of data when compared with CDs. However, in a case where management information such as TOC information stored in a CD is utilized, specific data is not necessarily uniquely specified. Furthermore, although an ISRC (International Standard Recording Code) or a cataloging number of the TOC is used as an identification signal in Japanese Patent No. 3104628, the ISRC and the cataloging number are arbitrarily recorded in a CD, that is, the ISRC and the cataloging number are not necessarily recorded in a CD. The ISRC and the cataloging number are inserted when an authoring process is performed on the CD, and may be mistakenly recorded twice or more at the time of the authoring process.

SUMMARY OF THE INVENTION

To address these problems, it is desirable to provide an information processing apparatus which uniquely and reliably specifies content and which realizes processing of obtaining content information, and to provide an information recording medium, an information processing method, and a computer program.

According to an embodiment of the present invention, there is provided an information processing apparatus that obtains pieces of content information relating to content recorded in an information recording medium, the information processing apparatus including, a data analyzing unit configured to read a content certificate which is recorded in the information recording medium and which corresponds to the content recorded in the information recording medium, a data transmitting unit configured to transmit a content certificate identifier analyzed using the data analyzing unit to a content information provision server, a data receiving unit configured to receive, from the content information provision server, the pieces of content information relating to the content which is specified on the bases of the content certification identifier, and a data outputting unit configured to output the pieces of content information received using the data receiving unit.

The data analyzing unit may obtain the content certification identifier constituted by a combination of a plurality of pieces of identification data recorded in the content certificate.

The data analyzing unit may obtain the content certification identifier constituted by the following pieces of data, that is, (a) an applicant identifier which is an identifier used to specify a provider of the content recorded in the information recording medium or a disc manufacturer which is a manufacturer of the information recording medium, and (b) a content sequence number which is an identifier corresponding to the applicant identifier and the content recorded in the information recording medium.

The content certificate may include the content certificate identifier, pieces of data including digest values generated from a content hash table, and a digital signature, and the content certificate identifier and the digital signature may be assigned to the content certificate in accordance with a management system provided by a third party.

The data analyzing unit may check validity of the digital signature recorded in the content certificate so as to check validities of the content certificate and the content, and only when it is determined that the content certificate and the content are valid, that is, the content is not falsified, may obtain the content certificate identifier from the content certificate, and. The data transmitting unit may transmit the content certificate identifier.

The information processing apparatus may further include a reproduction controlling unit configured to control reproduction of the content recorded in the information recording medium. The data receiving unit may receive a content revocation list which is a list of invalid contents from the content information provision server along with the pieces of content information. The reproduction controlling unit may check validity of the content recorded in the information recording medium on the basis of the content revocation list, and may reproduce the content only when it is determined that the content is a valid content.

The data receiving unit may receive, as the pieces of content information, pieces of data including a title of the content recorded in the information recording medium from the content information provision server. The data outputting unit may output the pieces of data including the title of the content on a display unit.

The data receiving unit may receive, as an additional piece of content information, a piece of data which is to be reproduced along with the content recorded in the information recording medium from the content information provision server. The reproduction controlling unit may reproduce the content recorded in the information recording medium and the additional piece of content information received from the content information provision server.

The data receiving unit may receive, as an additional piece of content information, subtitle data to be reproduced along with the content recorded in the information recording medium from the content information provision server. The reproducing control unit may reproduce the content recorded in the information recording medium and the subtitle data received from the content information provision server.

The data receiving unit may receive, from the content information provision server, copy permission information which allows copy of the content recorded in the information recording medium to another recording medium. The reproduction controlling unit may copy the content recorded in the information recording medium to the other recording medium only when the reception of the copy permission information is confirmed.

According to another embodiment of the present invention, there is provided an information processing apparatus serving as a server that provides a user device with pieces of content information relating to content recorded in an information recording medium loaded in the user device, the information processing apparatus including a data receiving unit configured to receive a content certificate identifier included in a content certificate which is recorded in the information recording medium and which corresponds to the content recorded in the information recording medium, a database which includes the content certificate identifier and the pieces of content information which relate to the content specified on the basis of the content certificate identifier, the content certificate identifier being associated with the pieces of content information, a data retrieving unit configured to obtain the pieces of content information relating to the content which is specified on the basis of the content certificate identifier received using the data receiving unit, and a data transmitting unit configured to transmit the pieces of content information obtained using the data retrieving unit to the user device.

The content certificate may include the content certificate identifier, digest values generated using a content hash table, and a digital signature. The content certificate identifier and the digital signature may be assigned to the content certificate in accordance with a management system provided by a third party.

The data retrieving unit may obtain, as the pieces of content information, pieces of data including a title of the content recorded in the information recording medium from the database. The data transmitting unit may transmit the pieces of data including the title of the content to the user device.

The data retrieving unit may obtain, as an additional piece of content information, a piece of data which is to be reproduced along with the content recorded in the information recording medium from the database. The data transmitting unit may transmit the additional piece of content information which is to be reproduced along with the content to the user device.

The data retrieving unit may obtain, as an additional piece of content information, subtitle data which is to be reproduced along with the content recorded in the information recording medium from the database. The data transmitting unit may transmit the subtitle data which is to be reproduced along with the content to the user device.

The data retrieving unit may receive, from the database, copy permission information which allows copy of the content recorded in the information recording medium to another recording medium. The data transmitting unit may transmit the copy permission information to the user device.

According to a still another embodiment of the present invention, there is provided an information processing apparatus that obtains pieces of content information relating to content recorded in an information recording medium, the information processing apparatus including a data analyzing unit configured to read a content certificate which is recorded in the information recording medium and which corresponds to the content recorded in the information recording medium, and configured to obtain a content certificate identifier from the content certificate, a retrieving unit configured to search a table for the pieces of content information relating to the content specified using the content certificate identifier which has been analyzed using the data analyzing unit, and a data outputting unit configured to output the pieces of content information.

The content certificate may include the content certificate identifier, digest values generated using a content hash table, and a digital signature. The content certificate identifier and the digital signature may be assigned to the content certificate in accordance with a management system provided by a third party.

According to a further embodiment of the present invention, there is provided an information processing method for obtaining pieces of content information relating to content recorded in an information recording medium, the information processing method including the steps of reading a content certificate which is recorded in the information recording medium and which corresponds to the content recorded in the information recording medium, and obtaining a content certificate identifier from the content certificate using a data analyzing unit, searching, using a data retrieving unit, a table for the pieces of content information relating to the content specified using the content certificate identifier which has been analyzed using the data analyzing unit, and outputting, using a data outputting unit, the pieces of content information which have been searched using the data receiving unit.

An information recording medium in which a computer program used to obtain pieces of content information relating to content recorded in an information recording medium is recorded, the information recording medium makes an information processing apparatus execute the steps of reading a content certificate which is recorded in the information recording medium and which corresponds to content recorded in the information recording medium, and obtaining a content certificate identifier from the content certificate using a data analyzing unit, transmitting, using a data transmitting unit, the content certificate identifier which has been analyzed using the data analyzing unit to a content information provision server, receiving, using a data receiving unit, the pieces of content information which are relate to the content specified on the basis of the content certificate identifier and which are transmitted from the content information provision server, and outputting, using a data outputting unit, the pieces of content information which have been received using the data receiving unit.

Note that the computer program according to the present invention is a computer readable program which is provided for, for example, a computer system capable of executing various program codes, using a recording medium, such as a DVD, a CD, or an MO, or a communication medium, such as a network. Since the computer program is a computer readable program, processing is performed in the computer system on the basis of the program.

Other features and advantages of the present invention will become apparent in the following detailed written description and the accompanying drawings. Note that the "system" described herein means a configuration in which a plurality of apparatuses are logical integrated, and is not limited to a configuration in which a plurality of apparatuses having own configurations are stored in one case.

Accordingly, in this configuration, a content certificate identifier is obtained from a content certificate corresponding to content recorded in an information recording medium and is transmitted to a server. Furthermore, the server specifies the content in accordance with the content certificate identifier, obtains pieces of content information relating to the content, such as a music title, a work title, and a CD jacket picture, and provides an information processing apparatus with the pieces of content information. With this configuration, the content is uniquely specified and a configuration for performing service provision processing which serves as content information obtaining processing is realized.

BRIEF DESCRIPTION OF THE DRAWINGS

FIG. 4 is a diagram illustrating configurations of the content certificate and a content hash table;

FIG. 5 is a diagram illustrating an example of a data configuration of the content certificate;

FIG. 13 is a flowchart illustrating a sequence of the processing steps of obtaining the pieces of content information and the content revocation list (CRL) on the basis of the content certificate identifier (CCID) and the processing steps of checking the signature of the content certificate on the basis of the content verification on the basis of the CRL;

FIG. 14 is a diagram illustrating an example of processing of obtaining additional information (such as subtitle data) from a server on the basis of the content certificate identifier (CCID);

FIG. 15 is a diagram illustrating an example of processing (MC: Managed Copy) of copying content from medium to medium on the basis of the content certificate identifier (CCID);

FIG. 16 is a diagram illustrating a guide screen as a user interface;

FIG. 17 is a diagram illustrating a configuration and a function of an apparatus which performs the processing of obtaining the pieces of content information on the basis of the content certificate identifier (CCID); and FIG. 18 is a diagram illustrating a configuration and a function of a server which performs the processing of providing the pieces of content information on the basis of the content certificate identifier (CCID).

DESCRIPTION OF THE PREFERRED EMBODIMENTS

An information processing apparatus, an information recording medium, an information processing method, and a computer program according to the present invention will be described in detail hereinafter with reference to the accompanying drawings. Note that the description is made in the following order.

1. An outline of an example of a system configuration to which the present invention is applied 2. Pieces of data stored in an information recording medium 3. An example of processing of obtaining content information using a content certificate identifier (CCID)

4. An example of service provision processing using a content certificate identifier (CCID)

5. A configuration of an information processing apparatus

Figure 1:
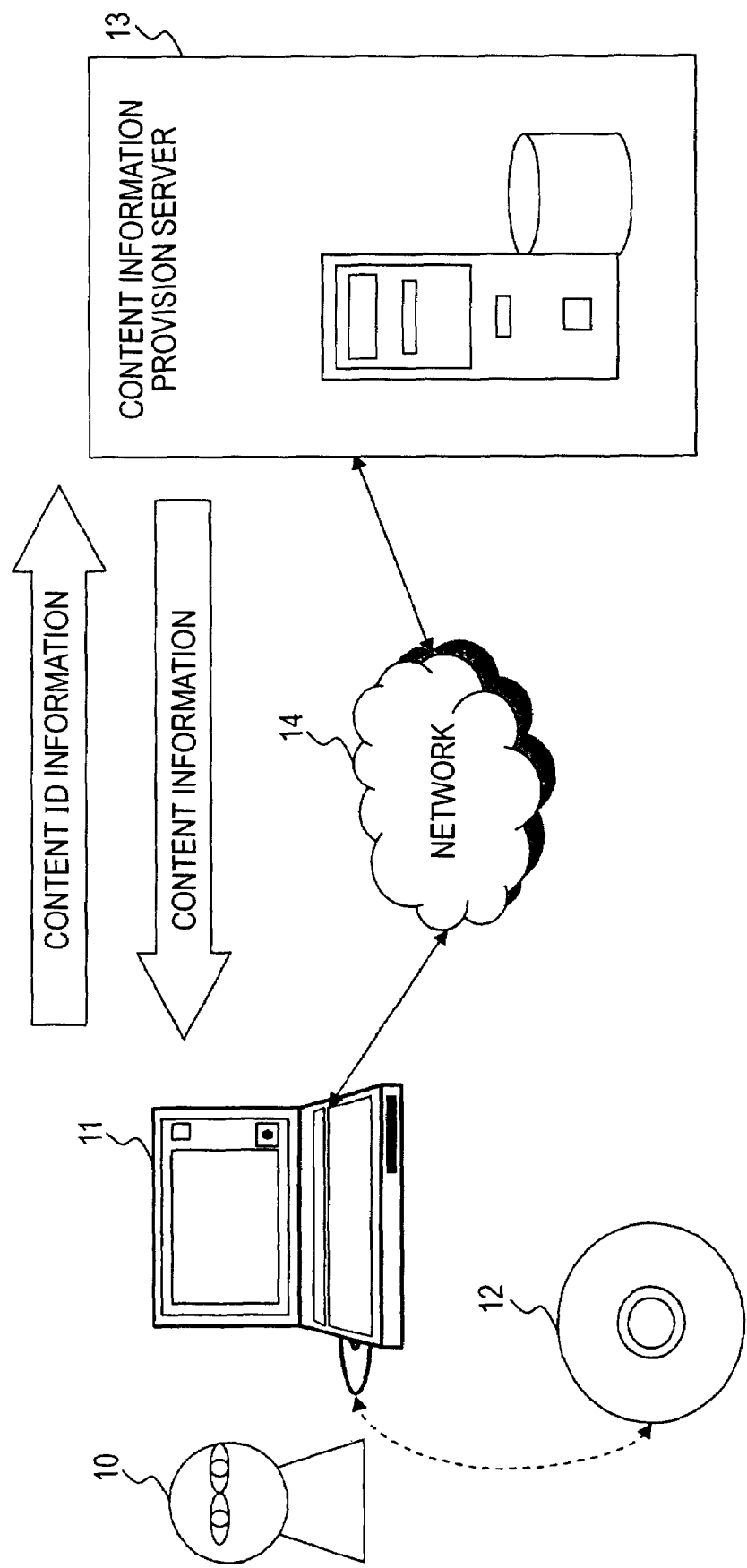
FIG. 1 is a diagram illustrating an example of a system to which the present invention is applied.

1. An Outline of an Example of a System Configuration to Which the Present Invention is Applied Referring to FIG. 1, an outline of an example of a system configuration to which the present invention is applicable will now be described. FIG. 1 shows an information processing apparatus 11 as a reproducing apparatus which performs information reproduction from an information recording medium used by a user 10. The information processing apparatus 11 is used as a reproducing apparatus which performs information reproduction from an information recording medium 12 such as a DVD (Digital Versatile Disc) or a BD (Blu-ray Disc: registered trademark).

The information recording medium 12 stores content such as music or a movie therein. A user 10 inserts the information recording medium 12 into the information processing apparatus 11 so that the content is reproduced. When the user 10 tries to obtain various pieces of content information stored in the information recording medium 12, the user uses the information processing apparatus 11 to transmit specific content identification information through a network 14 to a content information provision server 13. Examples of the various pieces of content information include, in the case of a piece of music, a music title, an artist name, and a picture image of a CD jacket, and in the case of a movie, a title of a movie, a director's name, actors' names, and a picture image of a poster.

The content information provision server 13 includes a database which stores various pieces of content information relating to content therein. In accordance with the content identification information transmitted from the information processing apparatus 11, the content information provision server 13 obtains pieces of content information (such as a music title and a work title) corresponding to content from the database, and the obtained pieces of content information are transmitted to the information processing apparatus 11. The information processing apparatus 11 displays the pieces of content information transmitted from the content information provision server 13 on a display unit. The user 10 views the pieces of content information relating to the content displayed on the display unit, and confirms the pieces of content information relating to the content stored in the information recording medium 12 which is loaded in the information processing apparatus 11.

As described above, in a case where a system in which a user transmits content identification information and obtains pieces of content information from a server is employed for a CD, TOC (Table of Contents) information recorded in the CD is transmitted to the server, and the server obtains pieces of content information corresponding to the TOC information and provides the user with the obtained pieces of content information. However, since the TOC information is not necessarily unique, it is possible that identical pieces of TOC information corresponding to different pieces of content information exist in a database. In this case, the user may not obtain the pieces of content information relating to the content.

The present invention realizes a configuration capable of obtaining pieces of content information from the server by utilizing the content certificate (CC) recorded in the information recording medium. An embodiment employing a BD (Blu-ray Disc: registered trademark) as the information recording medium will be described hereinafter. A content certificate issued in accordance with an AACS (Advanced Access Content System), which is a content management system, is stored in the BD in which content is recorded, and processing of obtaining the pieces of content information is performed using the content certificate. Note that the recording medium used in this embodiment is not limited to a BD, and any information recording medium may be employed as long as the information recording medium has a configuration in which a content certificate corresponding to content stored in the information recording medium is recorded in the information recording program.

2. Pieces of Data Stored in an Information Recording Medium

Figure 2:
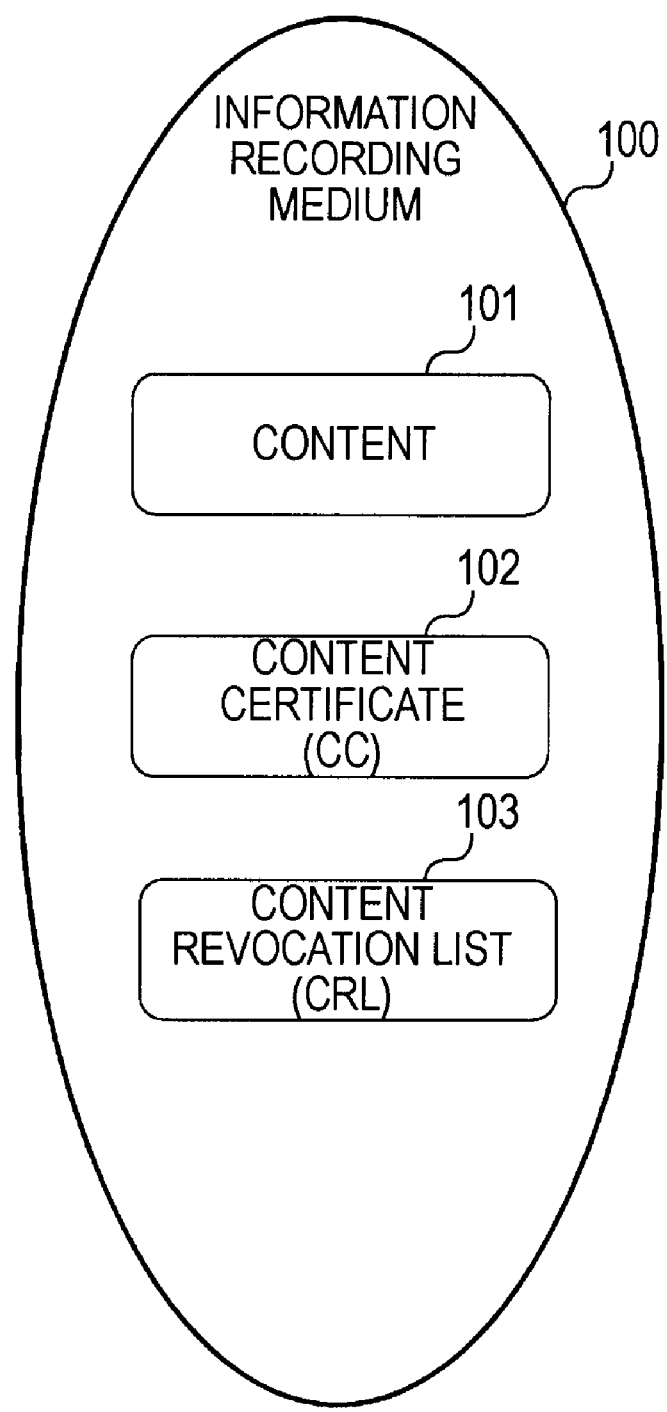
FIG. 2 is a diagram illustrating a configuration of an information recording medium storing pieces of data therein.

FIG. 2 shows pieces of data stored in an information recording medium 100. The information recording medium 100 includes content 101, a content certificate 102, and a content revocation list (CRL) 103. Note that although not shown in FIG. 2, pieces of data other than these pieces of data, such as management information corresponding to the content 101, use-control information, and information relating to decryption of encrypted content, are also stored in the information recording medium 100.

The content 101 represents a piece of music or a movie, for example. The content 101 may be a plurality of pieces of content 101. The content certificate 102 corresponds to the content 101 recorded in the information recording medium 100 and proves that the content 101 is valid content which is approved by the management system (such as the AACS). A digital signature generated in accordance with the management system (such as the AACS) is attached to the content certificate 102 so that falsification of the content certificate 102 is checked.

The content revocation list (CRL) 103 is used to detect illegal content. That is, the content revocation list (CRL) 103 is a list of pieces of illegally copied content, for example, which have been illegally distributed. In a case where the content 101 included in the information recording medium 100 is reproduced, the information processing apparatus (reproducing apparatus) 11 refers to the content revocation list (CRL) 103 before executing a content reproducing application. When it is determined that an ID of the content 101 included in the information recording medium 100 does not coincide with any of IDs of the pieces of content included in the content revocation list (CRL) 103, the reproduction of the content 101 is permitted.

Figure 3:
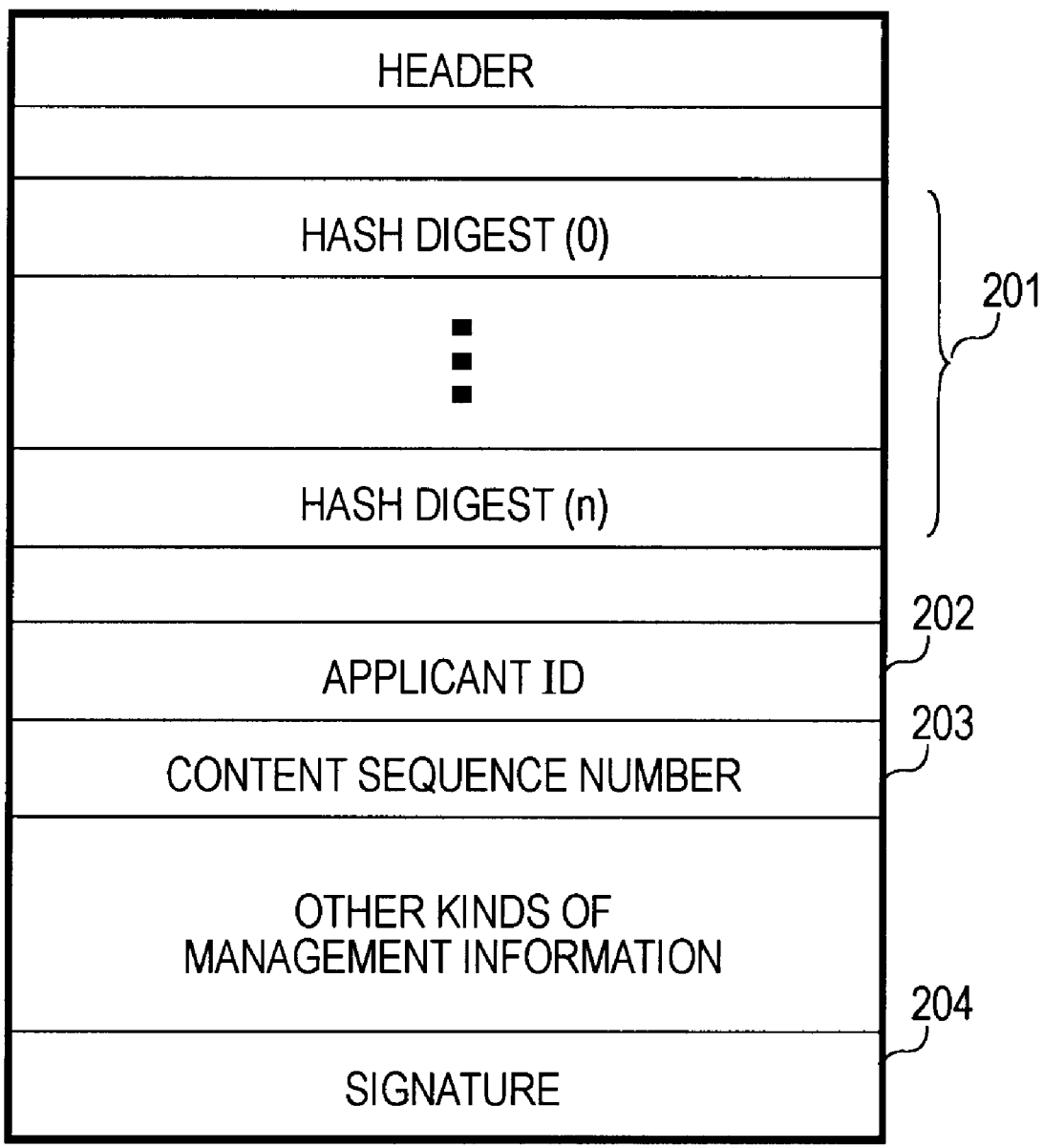
FIG. 3 is a diagram illustrating an example of a data configuration of a content certificate.

Referring to FIG. 3 and subsequent drawings, a configuration of the content certificate 102 will be described. The content certificate 102 includes, as shown in FIG. 3, pieces of data such as content hash digests 201 which are used to check whether the content 101 recorded in the information recording medium 100 is falsified. In addition, the content certificate 102 includes an applicant ID 202 which serves as an identifier used to specify a provider of the content recorded in the information recording medium or specify a disc manufacturer which is a manufacturer of the information recording medium, and further includes a content sequence number 203 which serves as an identifier corresponding to the content recorded in the recording medium. Furthermore, a digital signature 204 generated in accordance with the content management system (AACS, for example) is attached to the content certificate 102. Note that content is uniquely specified using a combination of the content sequence number 203 and the application ID instead of using only the content sequence number 203.

The hash digests registered in the content certificate 102 will be further described with reference to FIG. 4. In FIG. 4, (a) shows a configuration of the content certificate 102 in which a header, a plurality of hash digests (0) to (n) are registered, and a digital signature is assigned.

The hash digests (0) to (n) denote digest values of hash units, which are registered in a content hash table shown in (b) of FIG. 4. The content hash table is provided so as to correspond to content recorded in the information recording medium. For example, a content hash table is provided for a CPS unit which is provided for content or a content portion. A plurality of content hashes are recorded in the content hash table.

The content hashes are hash values generated in accordance with corresponding hash units (192 KB, for example) which are selected from a plurality of data portions included in the content shown in (c) of FIG. 4. For example, the content shown in (c) of FIG. 4 corresponds to one of the CPS units. Some of the plurality of data portions in the content are selected as the hash units. The hash values generated by calculation performed in accordance with pieces of data included in the hash units are registered in the content hash table.

Furthermore, hash values are newly calculated in accordance with the whole content hash table in which the pieces of data are registered. The newly calculated hash values are registered as hash digests in the content certificate 102 shown in (a) of FIG. 4. That is, different hash digests, i.e., hash values, are provided for different pieces of content (CPS units) recorded in the information recording medium.

The content hash table shown in (b) of FIG. 4 is used for, for example, falsification detection processing performed on content before the content is reproduced. For example, the hash units are extracted from the content to be reproduced, and hash values are calculated from the hash units in accordance with a predetermined algorithm for calculating a hash value. The calculated hash values are compared with the content hashes registered in the content hash table. In accordance with the results of the comparison, it is determined whether the content is falsified.

The content certificate 102 includes the hash digests which are used to detect falsification of the content hash table which is, in turn, used to detect falsification of the content as described above, and the applicant ID 202 serving as an identifier used to specify a provider of the content recorded in the information recording medium or specify a disc manufacturer which is a manufacturer of the information recording medium as described above. The content certificate 102 further includes a content sequence number 203 serving as an identifier which corresponds to the content recorded in the information recording medium and which corresponds to the application ID. An entire data configuration of the content certificate 102 is shown in FIG. 5.

The content certificate 102 includes the following pieces of data.
(a) Certificate Type: data indicating a kind of digital certificate
(b) Total_Number_of_HashUnits: the total number of hash units generated on the basis of the content
(c) Total_Number_of_Layers: the total number of layers of the information recording medium
(d) Layer_Number: a layer number corresponding to the content certificate
(e) Number_of_HashUnits: the number of hash units in the layers corresponding to the content
(f) Number_of_Digests: the number of Clip AV streams in the layers
(g) Applicant ID: an identifier (ID) uniquely assigned to individual licensed content providers or individual disc manufacturers
(h) Content Sequence Number: content identifier (ID) uniquely assigned to individual pieces of content by licensed content providers or disc manufacturers
(i) Minimum CRL Version: an earliest version of CRL (content revocation list) which can be referenced
(j) Length_Format_Specific_Section: the number of bytes of data having a specific format (the content certificate can be used in different formats)
(k) Hash_Value_of_MC_Manifest_File: a hash value used to detect falsification of a "Managed Copy Manifest File"
(l) Hash_Value_of_BDJ_Root_Cert: a hash value used to detect falsification of a "BD-J Root Certificate"
(m) Num_of_CPS_Unit: the number of the CPS units set in the content recorded in the information recording medium
(n) Hash_Value_of_CPS_Unit_Usage_File: a hash value of a CPU-unit-usage-control_information file
(o) Content Hash Table Digest: a hash value of a portion corresponding to one of clip AV streams in the content hash table
(p) Signature Data: a digital signature generated in accordance with a management system (AACS, for example) for the content certificate The pieces of data listed above are merely examples and are stored in the content certificate. The content certificate is stored, in accordance with the management system (AACS), in the BD in which the corresponding content is stored. Among the pieces of data listed above,
(g) Applicant ID
(h) Content Sequence Number
(i) Minimum CRL Version
(p) Signature Data
are generated in accordance with the management system (AACS). The other pieces of data may be generated by the content providers or the disc manufacturers.

Each of the hash digests described with reference to FIGS. 3 and 4 corresponds to the "(o) Content Hash Table Digest."

Furthermore, the applicant ID 202, which serves as an identifier used to specify a provider of the content recorded in the information recording medium or specify a disc manufacturer which is a manufacturer of the information recording medium as described with reference to FIG. 3, corresponds to "(g) Applicant ID." Moreover, the content sequence number 203, which serves as an identifier corresponding to the content recorded in the information recording medium, corresponds to "(h) Content Sequence Number."

A combination of "(g) Applicant ID" and "(h) Content Sequence Number," that is, "(g) Applicant ID (2B)"+"(h) Content Sequence Number (4B)" is referred to as a "CCID: Content Certificate ID (6B)."

The content certificate ID (CCID) is a unique identifier assigned to the content certificate (CC). The content certificate is provided for the content recorded in the information recording medium. In accordance with the content certificate ID, the content recorded in the information recording medium is specified. In this embodiment, the content certificate ID recorded in the content certificate is used as content specifying information to obtain pieces of content information relating to the content. That is, the content certificate includes the values of the hash digests which correspond to the content hash table used to detect falsification of the content. Furthermore, the content certificate ID ("Applicant ID" and "Content Sequence Number") assigned in accordance with the management system which is a third-party system to the content certificate along with the digital signature is used to uniquely specify the content. Specifically, since the content certificate is issued after a digital signature is assigned to the content certificate in accordance with the management system, a value of the digital signature is changed every time the content certificate ID is changed. Accordingly, the content certificate ID is not allowed to be changed in the disc manufacturers or by an author. Furthermore, the content certificate ID is assigned in accordance with the management system to data which is unique to the content and which has the digest values of the content hash table corresponding to the content. Accordingly, content certificates having the identical content certificate IDs correspond to a common content (content hash table). Furthermore, since the content certificate ID can be used to detect falsification of the corresponding content, an ISRC (International Standard Recording Code) or the like does not have to be specially added in accordance with another management system.

3. An Example of Processing of Obtaining Content Information Using a Content Certificate Identifier (CCID)

Figure 6:
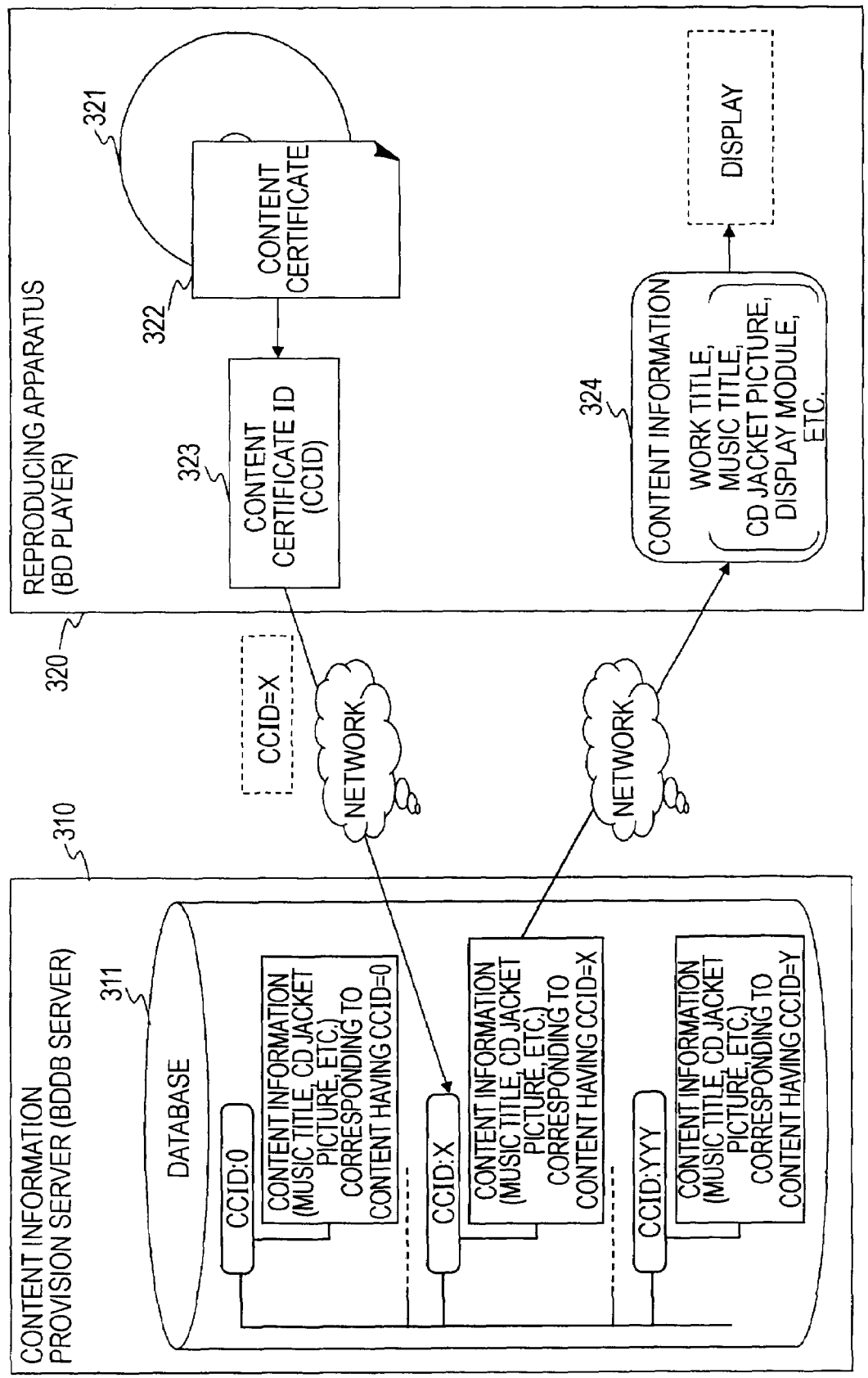
FIG. 6 is a diagram illustrating an example of processing of obtaining pieces of content information on the basis of a content certificate identifier (CCID)

Referring to FIG. 6, processing of obtaining pieces of content information by utilizing a content certificate ID (CCID) will be described. FIG. 6 shows a content information provision server (BDDB: BD Data Base) 310 and a reproducing apparatus 320 (a BD player, for example) as a user device used to reproduce content recorded in an information recording medium.

The reproducing apparatus 320 reproduces content by loading an information recording medium 321 in which the content is recorded. To obtain pieces of content information, such as a music title, a work title, and a CD jacket picture, corresponding to content recorded in the information recording medium 321, the reproducing apparatus 320 reads a content certificate (CC) 322 recorded in the information recording medium 321 to obtain a content certificate ID (CCID) 323. The content certificate ID 323 is constituted by "Applicant ID (2B)" and "Content Sequence Number (4B)" as described above.

The reproducing apparatus 320 transmits the content certificate ID 323 extracted from the content certificate 322 to the content information provision server 310. For example, in a case where CCID has a value X, the reproducing apparatus 320 transmits the value X through a network to the content information provision server 310.

The content information provision server (BDDB) 310 includes a database 311 which stores pieces of content information therein. The database 311 includes various pieces of content information, such as a music title, a work title, and a CD jacket picture, which relate to the content and which are specified by the content certificate ID (CCID). The pieces of content information are obtained from the database 311 on the basis of the content certificate ID. The content information provision server 310 searches the database 311 for pieces of content information 324 relating to the content corresponding to the content certificate ID using the content certificate ID as a key and obtains them. The obtained pieces of content information are transmitted to the reproducing apparatus 320.

The reproducing apparatus 320 receives the pieces of content information 324 from the content information provision server 310, and displays the received pieces of content information 324, such as a director's name, actors' name, a genre, a music title, a work title, and CD jacket picture on a display unit of the reproducing apparatus 320.

As described above, the content certification (CC) corresponding to the content recorded in the information recording medium 321 is also recorded in the information recording medium 321, and the content certificate ID (CCID) included in the content certificate may be used as information for specifying the content.

Note that the content certificate ID is constituted by the combination of "Applicant ID" corresponding to a content provider or a disc manufacturer and "Content Sequence Number" which is an identifier corresponding to the content as described above. The content certificate ID 323 is a unique identifier corresponding to the content. However, for example, in a case where different content providers and different disc manufacturers provide the same content, a plurality of content certificate IDs are added to the same content.

Even in the case where the plurality of content certificate IDs are added to the content, the content information provision server 310 provides a database from which the pieces of content information relating to the content are obtained in accordance with the plurality of content certificate IDs. Specifically, for example, in a case where two different CCIDS, i.e., CCID=101222 and CCID=103222, are added to the content, the pieces of content information relating to the content may be obtained using either of the two CCIDs.

Note that although a plurality of content certificate IDs may correspond to content, a single content certificate ID does not correspond to a plurality of pieces of content. Therefore, basically, when a content certificate ID is determined, content is determined, and furthermore, pieces of content information relating to the content are obtained from the database 311.

A sequence of processing steps performed using the reproducing apparatus 320 shown in FIG. 6 will now be described with reference to a flowchart shown in FIG. 7. First, the information recording medium 321 (BD-ROM, for example) is loaded into the reproducing apparatus 320 and the reproducing apparatus 320 starts reading data. In step S101, the reproducing apparatus 320 reads the content certificate 322 from the information recording medium 321. In step S102, the reproducing apparatus 320 obtains the content certificate ID 323 recorded in the content certificate 322.

In step S103, the reproducing apparatus 320 uploads the content certificate ID 323 to the content information provision server 310. In step S104, the reproducing apparatus 320 downloads pieces of content information (such as a work title and a CD jacket picture) from the content information provision server 310. In step S105, the reproducing apparatus 320 displays the downloaded pieces of content information (such as a work title and a CD jacket picture) on a display unit thereof. Note that, in an example shown in FIG. 6, the database 311 corresponding to the content certificate ID 323 is included in the content information provision server 310 which is connected to the reproducing apparatus 320 through the network. However, the reproducing apparatus 320 may include the content certificate ID 323 and the database 311 corresponding to the content certificate ID 323. In this case also, the content is uniquely specified using the content certificate ID 323.

Figure 7:
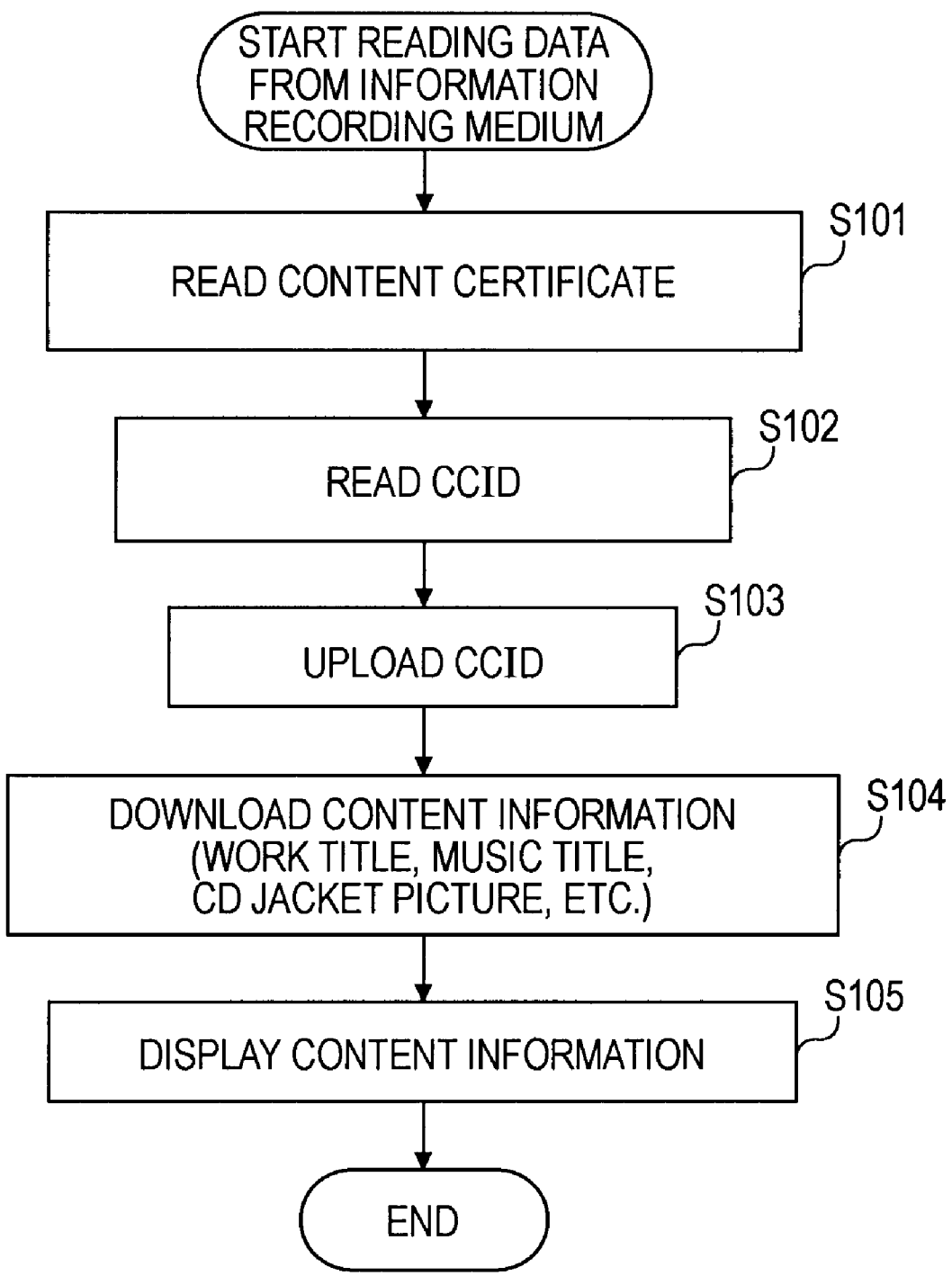
FIG. 7 is a flowchart illustrating a sequence of processing steps of obtaining the pieces of content information on the basis of the content certificate identifier (CCID)

The sequence of the processing steps of the reproducing apparatus 320 which is described with reference to FIG. 7 is performed on the assumption that the content certificate 322 read from the information recording medium 321 is a valid certificate. However, the content certificate 322 may be an invalid certificate. Referring to a flowchart shown in FIG. 8, processing of determination as to whether the content certificate 322 is valid will be described.

First, the information recording medium 321 (a BD-ROM, for example) is loaded into the reproducing apparatus 320, and the reproducing apparatus 320 starts reading data. In step S151, the reproducing apparatus 320 reads the content certificate 322 from the information recording medium 321. In step S152, the reproducing apparatus 320 checks the digital signature registered in the content certificate 322. As described with reference to FIGS. 3 to 5, the content certificate 322 includes the digital signature recorded in accordance with the content management system (AACS, for example). The reproducing apparatus 320 verifies the digital signature using a public key provided in accordance with the content management system (AACS, for example).

In step S153, when it is determined that the digital signature is valid, that is, the content certificate 322 is not falsified, and therefore, is a valid certificate, the process proceeds to step S154. On the other hand, in step S153, when it is determined that the digital signature is invalid, that is, the content certificate 322 is falsified, and therefore, is an invalid certificate, the process proceeds to step S161 and the content is not reproduced.

After it is determined that the digital signature is valid in step S153, the reproducing apparatus 320 obtains the content certificate ID 323 recorded in the content certificate 322 in step S154. In step S155, the reproducing apparatus 320 uploads the content certificate ID 323 to the content information provision server 310. In step S156, the reproducing apparatus 320 downloads pieces of content information (such as a work title and a CD jacket picture) from the content information provision server 310. In step S157, the reproducing apparatus 320 displays the downloaded pieces of content information (such as a work title and a CD jacket picture) on a display unit thereof.

Figure 8:
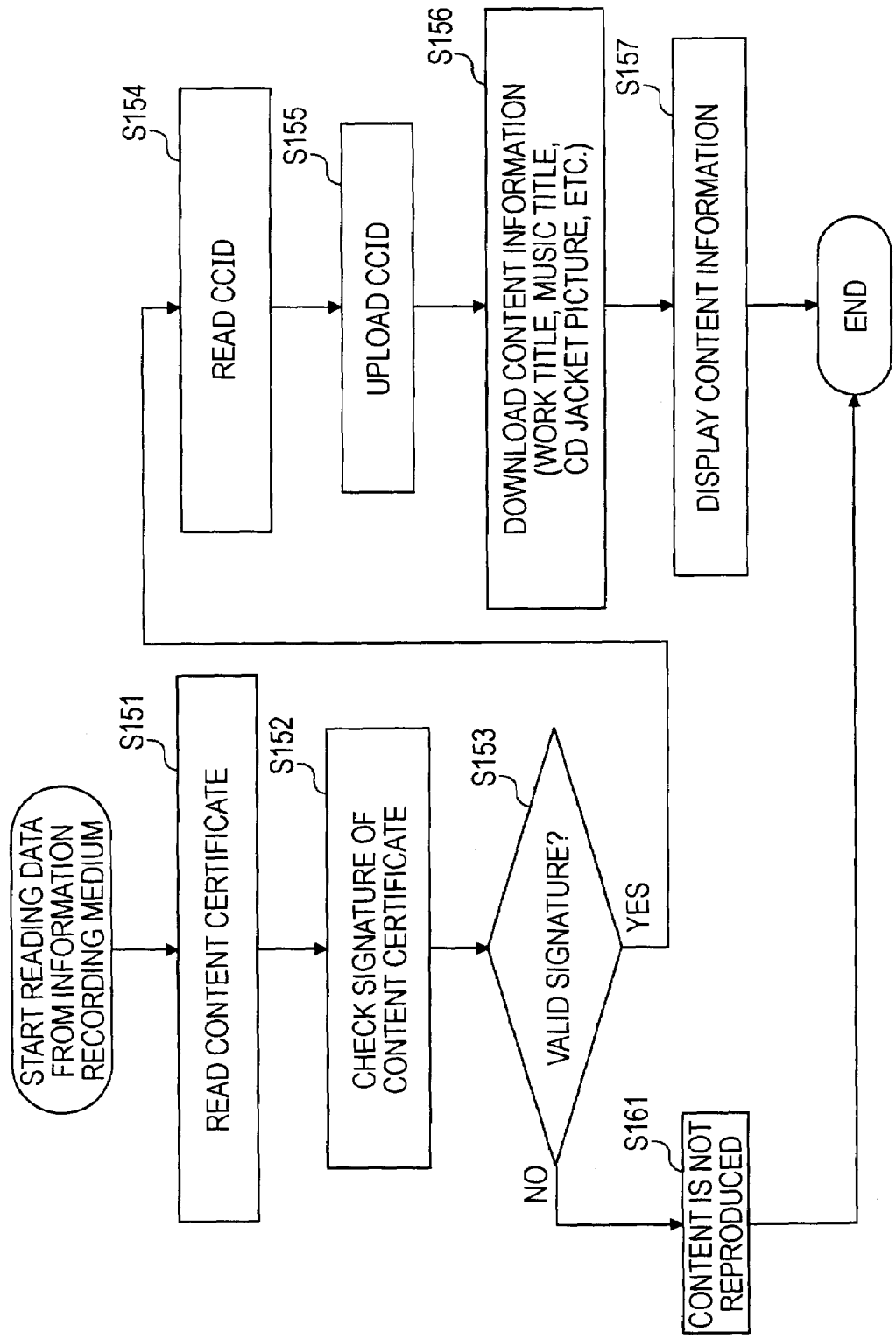
FIG. 8 is a flowchart illustrating a sequence of processing steps of checking a signature of the content certificate and the processing steps of obtaining the pieces of content information on the basis of the content certificate identifier (CCID)

In the flowchart shown in FIG. 8, the validity of the content certificate 322 recorded in the information recording medium 321 is checked, and only when it is determined that the content certificate 322 is a valid certificate, the pieces of content information are obtained and reproduced. Accordingly, when the content certificate 322 is invalid, the pieces of content information are not obtained, and therefore, the content is not reproduced. That is, the pieces of content information are prevented from being illegally obtained.

Figure 9:
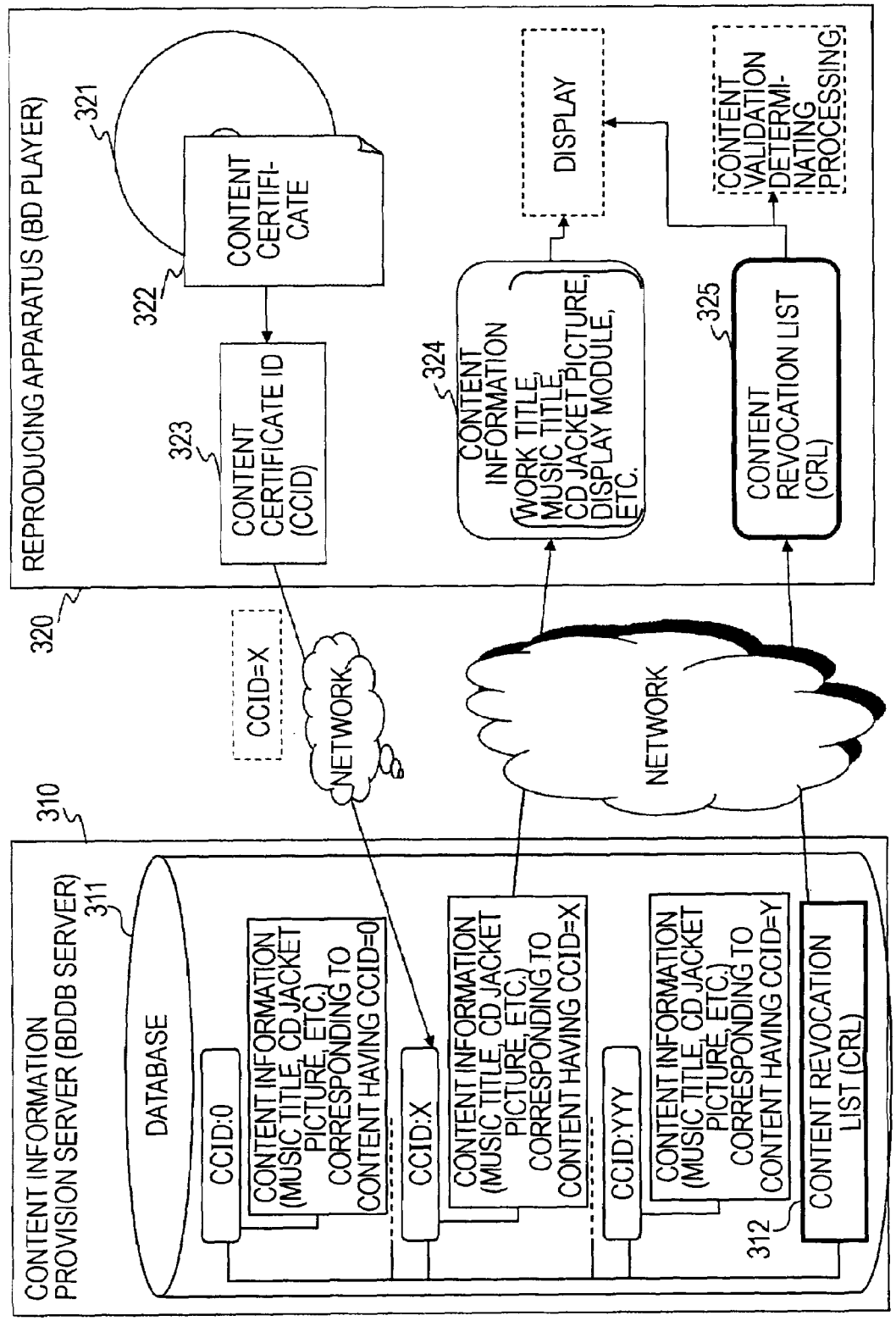
FIG. 9 is a diagram illustrating an example of processing of obtaining the pieces of content information and a content revocation list (CRL) on the basis of the content certificate identifier (CCID)

Referring to FIG. 9, an configuration in which the reproducing apparatus 320 obrains a content revocation list (CRL) 312 along with pieces of content information 324 from the content information provision server 310 using the content certificate ID 323 will be described.

As described with reference to FIG. 2, pieces of information such as content IDs used to detect illegal content such as pieces of illegally-copied content are recorded in the content revocation list 312. Before executing a reproducing application, the reproducing apparatus 320 refers to the content revocation list 312 to check whether an ID of the content stored in the information recording medium 321 coincides with one of the IDs recorded in the content revocation list 312. When it is determined that the ID of the content stored in the information recording medium 321 does not coincide with any of the IDs recorded in the content revocation list 312, the content is reproduced.

As described with reference to FIG. 2, the content revocation list 312 is also stored in the information recording medium 321. However, a version of the content revocation list 312 is frequently updated, and the pieces of data listed in the content revocation list 312 are also updated. Accordingly, when the reproducing apparatus 320 checks whether the ID of the content stored in the information recording medium 321 coincides with one of the IDs recorded in the content revocation list 312 before reproducing the content, the latest version of the content revocation list 312 is preferably used. In the processing example shown in FIG. 9, since the latest version of the content revocation list 312 is provided by the content information provision server 310, the reproducing apparatus 320 checks whether the content stored in the information recording medium 321 is valid using the latest content revocation list 312.

As shown in FIG. 9, the content information provision server 310 includes the database 311 which further stores the content revocation list 312 therein. When receiving a request from the reproducing apparatus 320 for obtaining the pieces of content information 324 on the basis of the content certificate ID 323, the content information provision server 310 obtains the pieces of content information 324 from the database 311 on the basis of the content certificate ID 323 and transmits the obtained pieces of content information 324 to the reproducing apparatus 320. In addition, the content information provision server 310 obtains the latest version of the content revocation list 312 from the database 311 and transmits the obtained content revocation list 312 to the reproducing apparatus 320.

The reproducing apparatus 320 displays the pieces of content information 324 transmitted from the content information provision server 310 on a display unit, for example. Furthermore, the reproducing apparatus 320 displays the content revocation list 325 which corresponds to the content revocation list 312 transmitted from the content information provision server 310 on the display unit. Moreover, the reproducing apparatus 320 determines whether an ID of the content stored in the information recording medium 321 coincides with one of the IDs recorded in the content revocation list 325 before the content is reproduced. When it is determined that the content recorded in the information recording medium 321 is invalid on the basis of the content revocation list 325, the content is not reproduced. These processes are performed using a content reproducing application.

The sequence of the processing steps performed using the reproducing apparatus 320 shown in FIG. 9 will be described with reference to a flowchart shown in FIG. 10. First, the information recording medium 321 (BD-ROM, for example) is loaded into the reproducing apparatus 320 and the reproducing apparatus 320 starts reading data. In step S201, the reproducing apparatus 320 reads the content certificate 322 from the information recording medium 321. In step S202, the reproducing apparatus 320 obtains the content certificate ID 323 recorded in the content certificate 322.

In step S203, the reproducing apparatus 320 uploads the content certificate ID 323 to the content information provision server 310. In step S204, the reproducing apparatus 320 downloads pieces of content information (such as a work title and a CD jacket picture) and the content revocation list 312 from the content information provision server 310. In step S205, the reproducing apparatus 320 displays the downloaded pieces of content information (such as a work title and a CD jacket picture) and the content revocation list 325 corresponding to the content revocation list 312 stored in the content information provision server 310 on a display unit thereof.

Figure 10:
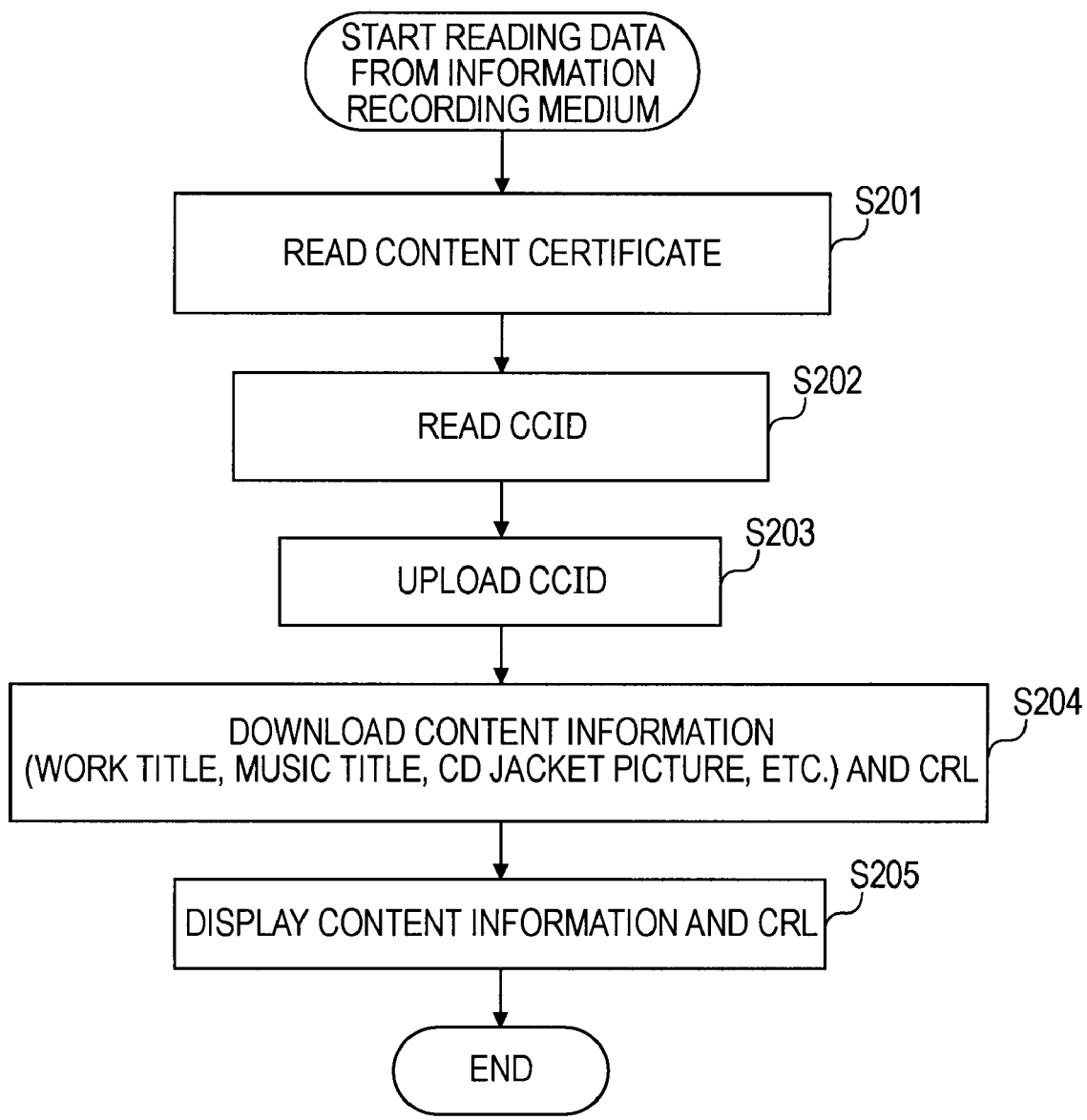
FIG. 10 is a flowchart illustrating a sequence of processing steps of obtaining the pieces of content information and the content revocation list (CRL) on the basis of the content certificate identifier (CCID)

The sequence of the processing steps of the reproducing apparatus 320 which is described with reference to FIG. 10 is performed on the assumption that the content certificate 322 read from the information recording medium 321 is a valid certificate. However, the content certificate 322 may be an invalid certificate. Referring to a flowchart shown in FIG. 11, processing of determination as to whether the content certificate 322 is valid will be described.

First, the information recording medium 321 (a BD-ROM, for example) is loaded into the reproducing apparatus 320, and the reproducing apparatus 320 starts reading data. In step S251, the reproducing apparatus 320 reads the content certificate 322 from the information recording medium 321. In step S252, the reproducing apparatus 320 checks the digital signature registered in the content certificate 322. As described with reference to FIGS. 3 to 5, the content certificate 322 includes the digital signature recorded in accordance with the content management system (AACS, for example). The reproducing apparatus 320 checks whether the digital signature is valid using a public key provided in accordance with the content management system (AACS, for example).

In step S253, when it is determined that the digital signature is valid, that is, the content certificate 322 is not falsified, and therefore, is a valid certificate, the process proceeds to step S254. On the other hand, in step S253, when it is determined that the digital signature is invalid, that is, the content certificate 322 is falsified, and therefore, is an invalid certificate, the process proceeds to step S261 and the content is not reproduced.

After it is determined that the digital signature is valid in step S253, the reproducing apparatus 320 obtains the content certificate ID 323 recorded in the content certificate 322 in step S254. In step S255, the reproducing apparatus 320 uploads the content certificate ID 323 to the content information provision server 310. In step S256, the reproducing apparatus 320 downloads pieces of content information (such as a work title and a CD jacket picture) and the content revocation list 312 from the content information provision server 310. In step S257, the reproducing apparatus 320 displays the downloaded pieces of content information (such as a work title and a CD jacket picture) and the content revocation list 325 corresponding to the content revocation list 312 stored in the content information provision server 310 on a display unit thereof.

Figure 11:
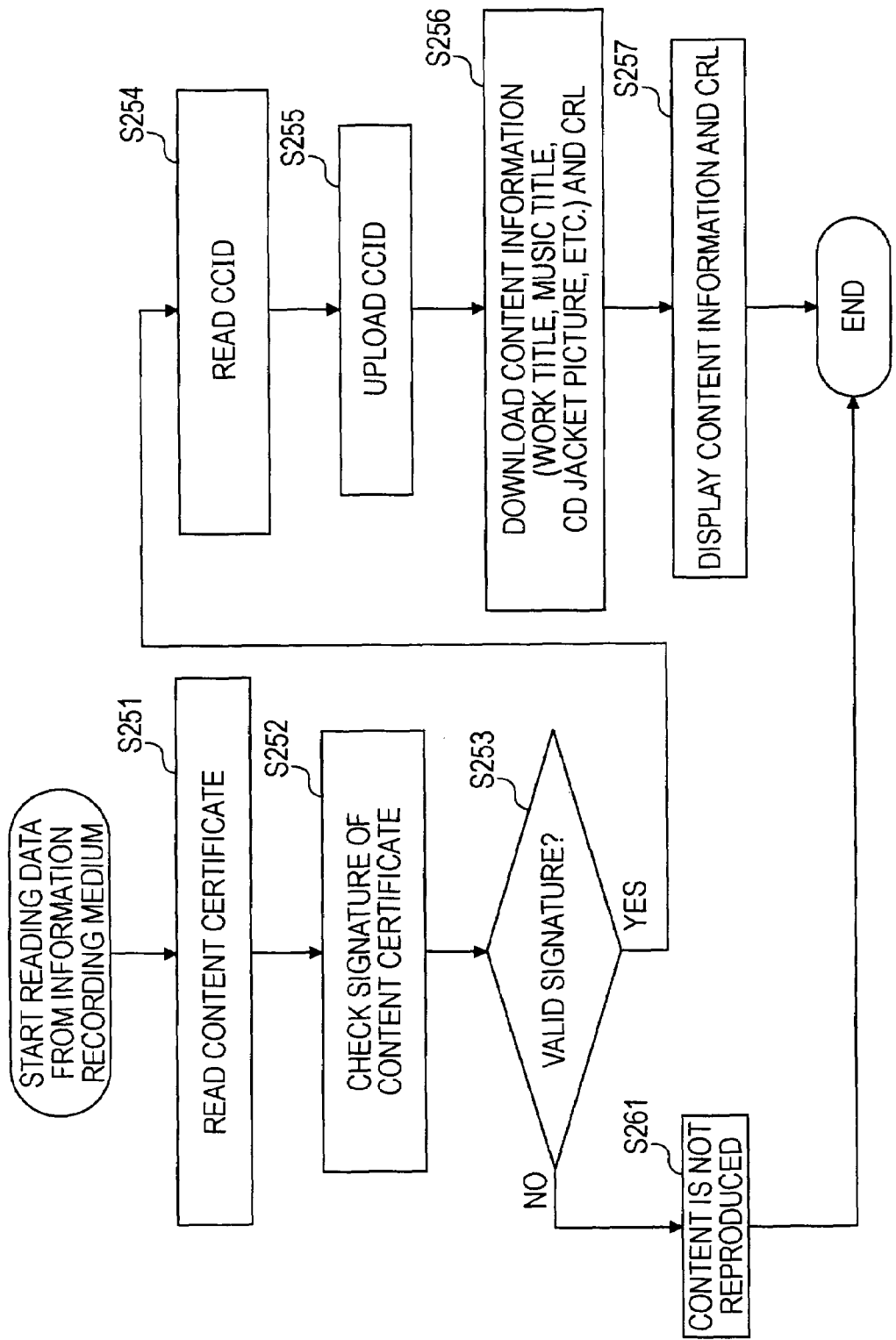
FIG. 11 is a flowchart illustrating a sequence of processing steps of checking a signature of the content certificate and the processing steps of obtaining the pieces of content information and the content revocation list (CRL) on the basis of the content certificate identifier (CCID)

In the flowchart shown in FIG. 11, it is determined whether the content certificate 322 recorded in the information recording medium 321 is valid, and only when it is determined that the content certificate 322 is a valid certificate, the pieces of content information are obtained and reproduced. Accordingly, when the content certificate 322 is invalid, the pieces of content information are not obtained, and therefore, the content is not reproduced. That is, the pieces of content information are prevented from being illegally obtained.

Next, a sequence of the processing steps of checking the validation of the content recorded in the information recording medium 321 using the content revocation list 325 obtained from the content information provision server 310 in order to determine whether the reproducing apparatus 320 reproduces the content will be described with reference to a flowchart shown in FIG. 12.

First, the information recording medium 321 (BD-ROM, for example) is loaded into the reproducing apparatus 320 and the reproducing apparatus 320 starts reading data. In step S301, the reproducing apparatus 320 reads the content certificate 322 from the information recording medium 321. In step S302, the reproducing apparatus 320 obtains the content certificate ID 323 recorded in the content certificate 322.

In step S303, the reproducing apparatus 320 uploads the content certificate ID 323 to the content information provision server 310. In step S304, the reproducing apparatus 320 downloads pieces of content information (such as a work title and a CD jacket picture) and the content revocation list 312 from the content information provision server 310. In step S305, the reproducing apparatus 320 displays the downloaded pieces of content information (such as a work title and a CD jacket picture) and the content revocation list 325 corresponding to the content revocation list 312 stored in the content information provision server 310 on a display unit thereof.

Then, in step S306, the reproducing apparatus 320 compares pieces of information registered in the content revocation list 325, which is downloaded from the content information provision server 310, such as IDs of pieces of invalid content and an ID of the content to be reproduced which is stored in the information recording medium 321. When it is determined that the ID of the content to be reproduced stored in the information recording medium 321 coincides with one of the IDs of pieces of invalid content recorded in the content revocation list 312, the content to be reproduced is determined to be an invalid content in step S307 and the process proceeds to step S309 and the content is not reproduced.

On the other hand, when it is determined that the ID of the content to be reproduced which is stored in the information recording medium 321 does not coincide with any of the IDs of pieces of invalid content recorded in the content revocation list 312, the content to be reproduced is determined to be a valid content in step S307 and the process proceeds step S308 and the content is reproduced.

Figure 12:
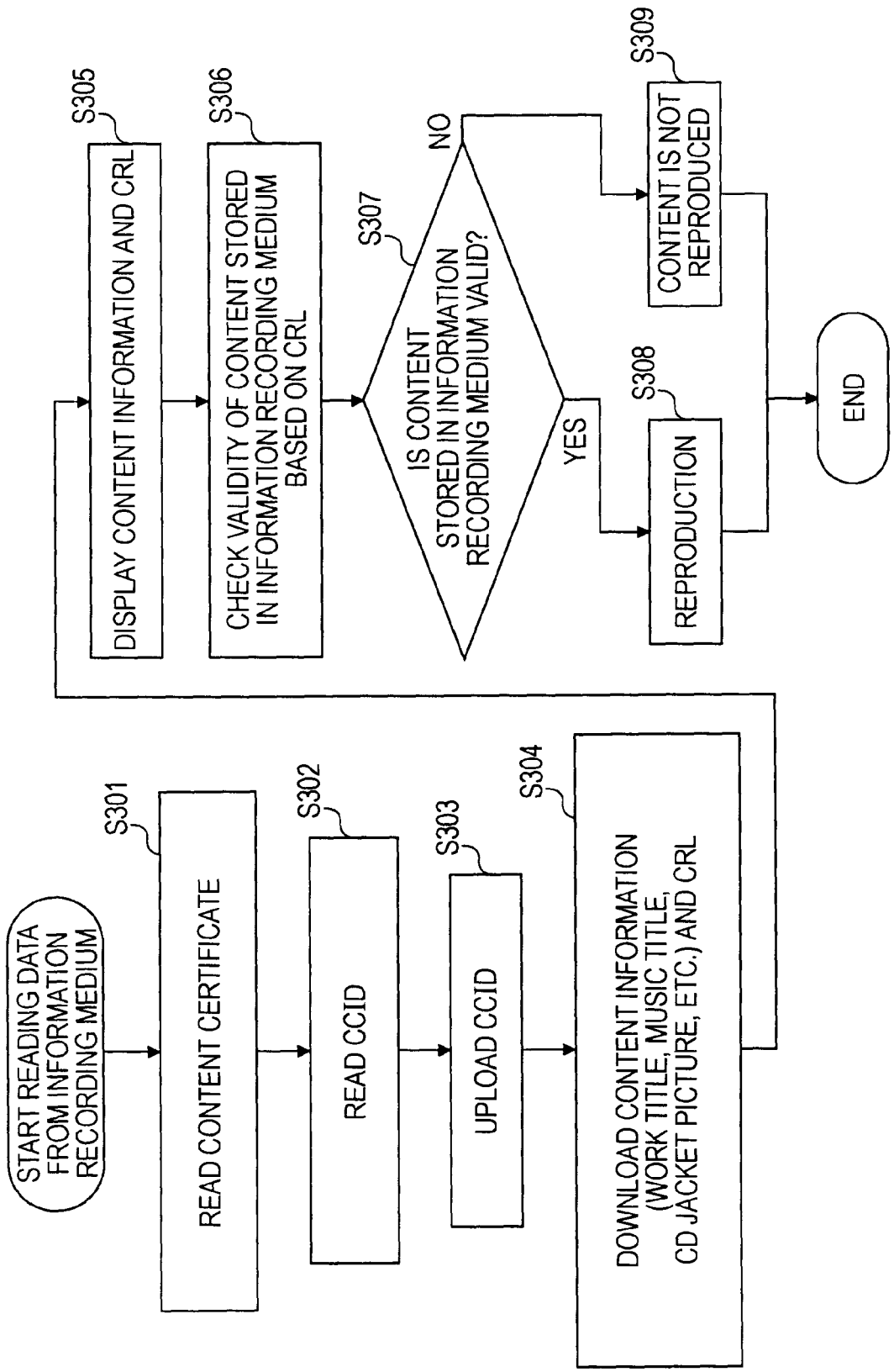
FIG. 12 is a flowchart illustrating a sequence of the processing steps of obtaining the pieces of content information and the content revocation list (CRL) on the basis of the content certificate identifier (CCID) and processing steps of checking content on the basis of the CRL.

The sequence of the processing steps of the reproducing apparatus 320 which is described with reference to FIG. 12 is performed on the assumption that the content certificate 322 read from the information recording medium 321 is a valid certificate. However, the content certificate 322 may be an invalid certificate. Referring to a flowchart shown in FIG. 13, processing of determination as to whether the content certificate 322 is valid will be described.

First, the information recording medium 321 (a BD-ROM, for example) is loaded into the reproducing apparatus 320, and the reproducing apparatus 320 starts reading data. In step S351, the reproducing apparatus 320 reads the content certificate 322 from the information recording medium 321. In step S352, the reproducing apparatus 320 checks the digital signature registered in the content certificate 322. As described with reference to FIGS. 3 to 5, the content certificate 322 includes the digital signature recorded in accordance with the content management system (AACS, for example). The reproducing apparatus 320 checks whether the digital signature is valid using a public key provided in accordance with the content management system (AACS, for example).

In step S353, when it is determined that the digital signature is valid, that is, the content certificate 322 is not falsified, and therefore, is a valid certificate, the process proceeds to step S354. On the other hand, in step S353, when it is determined that the digital signature is invalid, that is, the content certificate 322 is falsified, and therefore, is an invalid certificate, the process proceeds to step S371 and the content is not reproduced.

After it is determined that the digital signature is valid in step S353, the reproducing apparatus 320 obtains the content certificate ID 323 recorded in the content certificate 322 in step S354. In step S355, the reproducing apparatus 320 uploads the content certificate ID 323 to the content information provision server 310. In step S356, the reproducing apparatus 320 downloads pieces of content information (such as a work title and a CD jacket picture) and the content revocation list 312 from the content information provision server 310. In step S357, the reproducing apparatus 320 displays the downloaded pieces of content information (such as a work title and a CD jacket picture) and the content revocation list 325 corresponding to the content revocation list 312 stored in the content information provision server 310 on a display unit thereof.

Then, in step S358, the reproducing apparatus 320 compares the pieces of information registered in the content revocation list 325, which is downloaded from the content information provision server 310, such as IDs of pieces of invalid content and an ID of the content to be reproduced which is stored in the information recording medium 321. When it is determined that the ID of the content to be reproduced which is stored in the information recording medium 321 coincides with one of the IDs of pieces of invalid content recorded in the content revocation list 312, the content to be reproduced is determined to be an invalid content in step S359 and the process proceeds to step S362 and the content is not reproduced.

On the other hand, when it is determined that the ID of the content to be reproduced stored in the information recording medium 321 does not coincide with any of the IDs of pieces of invalid content recorded in the content revocation list 312, the content to be reproduced is determined to be a valid content in step S359 and the process proceeds step S361 and the content is reproduced.

In the flowcharts shown in FIGS. 12 and 13, the validation of the content is checked using the content revocation list 325 downloaded from the content information provision server 310 so that it is determined whether the content recorded in the information recording medium 321 is reproduced. The content revocation list 325 corresponding to the content revocation list 312 provided by the content information provision server 310 for the reproducing apparatus 320 is a latest version at the time. Accordingly, the reproducing apparatus 320 can check the validation of the content using the latest version of the content revocation list 325. Even when the content revocation list 325 stored in the information recording medium 321 is the old one, since the content revocation list 325 is updated using the latest version of the content revocation list 312, the reproducing apparatus 320 can check the validation of the content using the content revocation list 325 which is updated to the latest version. Consequently, an invalid content is effectively prevented from being reproduced.

4. An Example of Service Provision Processing Using a Content Certificate Identifier (CCID)

The processing of obtaining pieces of content information such as a music title, a work title, and a CD jacket picture from a server using a content certificate ID has been described hereinabove. Furthermore, processing of obtaining, in addition to those pieces of content information, other pieces of content information such as subtitle data which is reproduced along with content recorded in an information recording medium and copy permission information which allows copy of the content recorded in the information recording medium to another medium using the content certificate ID will be described.

4.1. An Example of Processing in which Information Obtained from a Server is Reproduced Along with Content Stored in an Information Recording Medium An example of processing in which information obtained from a server is reproduced along with content stored in an information recording medium will be described with reference to FIG. 14. FIG. 14 illustrates an example of processing of obtaining subtitle data as content information corresponding to movie content from a server 430 using a content certificate ID 412 as content specifying information when a reproducing apparatus 420 reproduces the movie content recorded in an information recording medium 410.

In the example of the processing shown in FIG. 14, three content management applications are used in combination. First, executions of these three content management applications will be described.

(1) First Content Management Application (BD-J Application 1)

A first content management application (BD-J application 1) is executed before the reproducing apparatus 420 is connected to the server 430 and performs the following processing.

(a) Processing of confirming execution of download of content to a user
(b) Processing of checking whether the reproducing apparatus 420 is capable of connecting to a network or has an online function in accordance with the AACS
(c) Processing of providing a URL to be accessed
(d) Processing of updating pieces of management data (org_id, disc_id) of a local storage unit and data relating to AACS
(e) Charging process (option)

(2) Second Content Management Application (BD-J Application 2)

A second content management application (BD-J application 2) is obtained and executed by the server 430 and performs the following processing.

(a) Processing of making a user select a product (download data)
(b) Processing of informing the server 430 of the product selected by the user
(c) Charging process (option)

(3) Third Content Management Application (BD-J Application 3)

A third content management application (BD-J application 3) is obtained and executed by the server 430 when the download data is recorded in the local storage unit, and performs the following processing.

(a) Processing of setting a usage state of a VFS (virtual file system), which is used to integrate a plurality of file systems and which is used to execute processes of the plurality of file systems, to an available state and recording an AV file (content to be reproduced) in the local storage unit
(b) Processing of setting the usage state of the VFS to the available state and recording the file relating to AACS (management information) in the local storage unit As described above, since each of the three applications has the unique processes and is individually obtained from a disc or the server 430, degree of freedom in a case where each of the applications is updated, for example, is increased. Accordingly, the applications are easily managed and high-quality service may be provided.

Referring to FIG. 14, a sequence of the processing will be described. The reproducing apparatus 420 activates the first content management application (BD-J application 1) recorded in the information recording medium (a ROM disc, for example) 410. In accordance with the first content management application (BD-J application 1), the reproducing apparatus 420 obtains the content certificate ID 412 recorded in the ROM disc 410 in step S501, and transmits the obtained content certificate ID 412 to the server 430 which is used to provide sub-content.

In step S502, the server 430 selects the second content management application (BD-J application 2) 431 from a database on the basis of the received content certificate ID 412 and transmits the second content management application (BD-J application 2) to the reproducing apparatus 420. Here, the server 430 stores therein content usage condition information corresponding to content specified using the content certificate ID 412. On the basis of the content usage condition information, the server 430 selects the second content management application (BD-J application 2) 431, and transmits the second content management application (BD-J application 2) 431 to the reproducing apparatus 420.

The reproducing apparatus 420 performs processing on the basis of the second content management application (BD-J application 2) 422 received from the server 430. The reproducing apparatus 420 displays on a display unit an offer list, which is a list including acceptable processes, included in the second content management application (BD-J application 2) 422. Then, in step S503, the reproducing apparatus 420 selects processing requested by the user, for example, processing of downloading the content.

On the basis of the selection of the processing, the reproducing apparatus 420 performs settlement processing by transferring settlement data between the reproducing apparatus 420 and the server 430. For example, the reproducing apparatus 420 displays a settlement screen on the display unit, and the user inputs data, such as a credit-card number, necessary for the settlement processing using the settlement screen. Then, in step S504, the server 430 permits the settlement processing and information of the permission is transmitted to the reproducing apparatus 420.

In step S504, the server 430 transmits encrypted content 434, management data 433, data including the third content management application (BD-J application 3) 432 which performs recording processing to the reproducing apparatus 420. Note that digital signatures are assigned to these pieces of data by the server 430.

Before executing the third content management application (BD-J application 3) 423 transmitted from the server 430, the reproducing apparatus 420 checks the digital signatures in order to determine whether the content is falsified, that is, whether the content is a valid content. It is assumed that the content is determined to be a valid content, in step S505, a recording controller records management data 441 and encrypted content 442, such as the subtitle data to be reproduced along with the content recorded in the information recording medium 410, in a local storage unit 440. Accordingly, the local storage unit 440 stores the encrypted content 442 and the management data 441 therein.

When the content recorded in the information recording medium 410 is reproduced, the encrypted content 442 such as the subtitle data recorded in the local storage unit 440 is also reproduced. Accordingly, data such as the subtitle data which is not recorded in the information recording medium 410 may be reproduced by obtaining the data as an additional one of the pieces of content information from the server 430 on the basis of the content certificate ID 412.

In this processing, a plurality of content management applications are provided so that each of the plurality of content management applications has unique operations and is individually obtained from the disc or the server 430, degree of freedom in a case where each of the applications is updated, for example, is increased. Accordingly, the applications are easily managed and high-quality service may be provided.

Note that the data which is transmitted from the server 430 and which is reproduced is not limited to the subtitle data. However, other pieces of content information such as a work title, information about an episode, and information about actors may be obtained and reproduced. Furthermore, the data which is obtained from the server 430 and which is reproduced may be executed in parallel with the reproduction of the content recorded in the information recording medium 410, or may be executed separately from the reproduction of the content recorded in the information recording medium 410.

4.2. An Example of Processing in which a Server Controls Processing of Copying Content from an Information Recording Medium to an Another Medium An example of processing in which a server controls processing of copying content from an information recording medium to an another medium will be described with reference to FIG. 15. That is, in this processing, copy permission information is obtained as content information from a server, and thereafter, copy processing (MC: Managed Copy) of content between media is performed on the basis of the copy permission information.

In FIG. 15, from the left, an information recording medium (a ROM disc, for example) 510, a reproducing apparatus 520, an R/RE (recordable/rewritable) disc 550, and a server 540 are shown. The information recording medium 510 includes content which has already been recorded. The reproducing apparatus 520 reads data such as the content from the information recording medium 510 and records the content in the R/RE disc 550. The R/RE disc 550 is recordable/rewritable disc which is a copy destination of the content. The server 540 grants permission of the copy processing of the content and provides management data. The reproducing apparatus 520 is an information processing apparatus such as a PC or a general reproducing apparatus, and reads data from the information recording medium 510 and outputs the data to be recorded in the R/RE disc 550. The R/RE disc 550 is a data recordable medium, and specifically, the R/RE disc 550 is a Blu-ray Disc (registered trademark), such as a BD-R or a BD-RE, or a DVD disc.

As shown in FIG. 15, the information recording medium 510 stores encrypted content 513, management data (AACS data) 512, and a content certificate (CC) therein. The encrypted content 513 may be an AV (Audio Visual) stream of moving picture content such as HD (High Definition) movie content which is high-resolution moving picture data, music data, a game program, an image file, audio data, or text data. The management data 512 includes key information used for decryption of the encrypted content 513, and usage control information. The content certificate corresponds to the content stored in the information recording medium 510 and includes content certificate ID (CCID) 511. In the example of the processing, a content management application 514 which is a program of executing processing necessary for the content copy processing is stored in the information recording medium 510.

The content management application 514 is a program of executing processing necessary for the content copy processing and performs processing of step S600 shown in FIG. 15. The reproducing apparatus 520 obtains the content management application 514 from the information recording medium 510 and executes the content management application 514 to perform the content copy processing. The content management application 514 is executed in step S600. The content management application 514 sequentially performs the following processing.

(a) Processing of transmitting the content certificate ID 511 to the server 540
(b) Processing of obtaining an offer list from the server 540
(c) Processing of transmitting information about a process selected by a user to the server 540
(d) Settlement processing
(e) Processing of obtaining copy permission information from the server 540, processing of checking the copy permission information, and processing of outputting the copy permission information to a recording controller
(f) Processing of monitoring the content copy processing performed by the recording controller
(g) Processing of monitoring writing processing of data downloaded from the server 540 performed by the recording controller Note that when the content management application 514 is executed and when a moving picture is reproduced on a guide screen, for example, the moving picture employing a playlist and a clipfile specified by the content management application 514 is executed.

The processing performed by the content management application 514 will be described with reference to FIGS. 15 and 16. The content management application 514 is executed in step S600 shown in FIG. 15. Note that when the processing is performed, the reproducing apparatus 520 displays on the display unit the guide screen serving as a user interface provided by the content management application 514 as shown in FIG. 16, for example. First, when the content management application 514 is executed, a selection screen shown in (a) of FIG. 16 is displayed. That is, the selection screen is used to select content copy processing (Managed Copy) or content download processing (Mod/EST). When the user requests the content copy processing, the content management application 514 transmits the content certificate ID 511 to the server 540 in response to the request by the user.

In step S601, the server 540 shown in FIG. 15 creates the offer list on the basis of the content certificate ID 511 and transmits the offer list to the reproducing apparatus 520.

The reproducing apparatus 520 displays an offer list 521 corresponding to the offer list created in the server 540 on the display unit. In step S602, the reproducing apparatus 520 accepts processing selected by the user. For example, it is assumed that, as shown in (d) of FIG. 16, the user selects "2. SNOW WHITE (300 yen)" as content to be copied.

In accordance with the selection, the reproducing apparatus 520 performs the settlement processing of transferring settlement data between the reproducing apparatus 520 and the server 540. For example, a settlement screen shown in (e) of FIG. 16 is displayed and the user inputs data, such as a credit-card number, necessary for the settlement processing using the settlement screen. Then, in step S603, the server 540 permits the processing of copying the content between media and information of the permission is transmitted to the reproducing apparatus 520.

The reproducing apparatus 520 supplies permission information 522, which corresponds to the copy permission information transmitted from the server 540, to the recording controller and the recording controller activates an encryption processing program. The processing employing the information recording medium 510 has been described hereinabove. Note that the permission information 522 is supplied to the recording controller using an API, and furthermore, the encryption processing program is activated using the API.

The recording controller performs processing of step S604 and subsequent steps shown in FIG. 15. Specifically, the management data 512 read from the information recording medium 510 is converted into management data compatible with the content to be copied to the R/RE disc 550. For example, an encryption key (unit key) compatible with the content to be copied is added to the management data 512, or usage permission information and the content certificate, for example, are converted into data compatible with the content to be copied. Information necessary for the data conversion are included in the permission information 522. The management data 512 is thus converted into management data (CP data) 551 and stored in the R/RE disc 550.

Furthermore, in step S605, the reproducing apparatus 520 obtains the encrypted content 513 recorded in the information recording medium 510, and outputs the encrypted content 513 after performing data conversion such as format conversion on the encrypted content 513. Thus, the encrypted content 513 recorded in the information recording medium 510 is copied to the in the R/RE disc 550 as an encrypted content 552. Note that the management data 551 recorded in the R/RE disc 550 includes the usage permission information, the content certificate, and other pieces of management data, which relate to the encrypted content 552 recorded in the R/RE disc 550.

While the recording controller performs the processes of steps S604 and S605, a screen indicating that the content copy processing is in progress is displayed on the display unit as shown in (f) of FIG. 16. This displaying processing is also performed using the content management application 514. Upon completion of the content copy processing using the recording controller, the content management application 514 outputs display data shown in (g) of FIG. 16 so that the user selects the next processing. When the user selects "Exit," a series of the processes of the content copy processing is terminated.

In this example of the content copy processing, as described above, the reproducing apparatus 520 performs the following two processes.
(1) The process performed by the content management application 514
(2) The process performed by the recording controller All processes other than the processes performed using the recording controller are performed using the content management application 514. In the content copy processing, the reproducing apparatus 520 supports an interactive communication between the user and the server 540 by receiving and displaying necessary information during a sequence of the processes, obtains permission information of the copy of the content from the server, supplies the permission information to the recording controller, confirms completion of the content copy processing performed using the recording controller, and receives confirmation of the completion of the content copy processing to terminate the content copy processing. Accordingly, the permission information is not illegally obtained, illegal use of the content is prevented, and illegal processing can be eliminated, that is, safe processing is attained.

5. A Configuration of an Information Processing Apparatus

Referring to FIGS. 17 and 18, an information processing apparatus (such as a reproducing apparatus) which obtains pieces of content information by transmitting a content certificate ID (CCID) to a server and a server which receives the content certificate ID and transmits the pieces of content information will be described.

Referring to FIG. 17, a function and a configuration of an information processing apparatus which obtains pieces of content information by transmitting the content certificate ID to a server will be described. As shown in FIG. 17, the information processing apparatus includes a data transmitting/receiving unit 801, a controller 802, a data analyzer 803, a recording and reproducing controller 804, a storage unit 805, a data output unit 806, and a medium I/F 807. The data transmitting/receiving unit 801 transmits data to the server and receives data from the server. The controller 802 integrally controls data processing performed using the information processing apparatus. The data analyzer 803 reads a content certificate 811 which is recorded in an information recording medium 810 and which corresponds to content recorded in the information recording medium 810, and obtains a content certificate ID from the content certificate 811. The recording and reproducing controller 804 controls processing of reproducing the content recorded in the information recording medium 810 and processing of recording (copying) the content recorded in the information recording medium 810. The storage unit 805 stores processing programs therein. The data output unit 806 includes, for example, a display unit which displays data. The medium I/F 807 is compatible with the information recording medium 810.

The data analyzer 803 reads the content certificate 811 from the information recording medium 810 and obtains the content certificate ID from the content certificate 811. Specifically, as described above, the data analyzer 803 obtains the content certificate ID constituted by a combination of the following two pieces of ID data (a) and (b).
(a) Applicant ID: an identifier for specifying a provider of the content recorded in the information recording medium or a disc manufacturer as a manufacturer of the information recording medium
(b) Content Sequence Number: an identifier corresponding to "Applicant ID" and the content recorded in the information recording medium Note that, as described above, the data analyzer 803 checks a digital signature recorded in the content certificate 811 as needed. When it is determined that the content certificate 811 is not falsified, that is, the content certificate 811 a valid certificate, the data analyzer 803 obtains the content certificate ID from the content certificate 811.

The data transmitting/receiving unit 801 transmits the content certificate ID analyzed using the data analyzer 803 to a content information provision server, and receives pieces of content information relating to content specified on the basis of the content certificate ID from the content information provision server. The pieces of content information are transmitted through the data transmitting/receiving unit 801 to the data output unit 806. The data output unit 806 displays the pieces of content information on the display unit.

Specifically, the data transmitting/receiving unit 801 receives the pieces of content information such as a music title, a work title, and a CD jacket picture relating to the content stored in the information recording medium 810 from the content information provision server. The data output unit 806 displays these pieces of content information on the display unit.

As described with reference to FIG. 14, the data transmitting/receiving unit 801 receives data to be reproduced along with reproduction of the content stored in the information recording medium 810, for example, subtitle data, as an additional piece of content information from the content information provision server. In this case, the recording and reproducing controller 804 reproduces the content recorded in the information recording medium 810 and the subtitle data received from the content information provision server.

Furthermore, when receiving the pieces of content information, the data transmitting/receiving unit 801 also receives a content revocation list (CRL) which lists IDs of pieces of invalid content from the content information provision server. The recording and reproducing controller 804 checks the validation of the content recorded in the information recording medium 810 on the basis of the content revocation list. When it is determined that the content recorded in the information recording medium 810 is a valid content, the recording and reproducing controller 804 reproduces the content.

As described with reference to FIG. 15, the data transmitting/receiving unit 801 receives, from the content information provision server, as an additional piece of content information, copy permission information which allows copy of the content recorded in the information recording medium 810 to another recording medium. In this case, when it is determined that the data transmitting/receiving unit 801 received the copy permission information from the content information provision server, the recording and reproducing controller 804 copies the content recorded in the information recording medium 810 to the other recording medium.

Referring to FIG. 18, a configuration and a function of a server which receives a content certificate ID (CCID) from a user device, which obtains pieces of content information relating to content to be reproduced on the basis of the content certificate ID, and which transmits the pieces of content information to the user device will be described.

As shown in FIG. 18, a content information provision server includes a controller 901, a data retrieving unit 902, a data transmitting/receiving unit 903, a database 905, and a storage unit 906. The controller 901 entirely controls generation and output of data. The data retrieving unit 902 searches the database 905 for the pieces of content information. The data transmitting/receiving unit 903 transmits data to the user device and receives data from the user device. The database 905 stores pieces of content information 911 corresponding to a content certificate ID (CCID) therein. The storage unit 906 stores various data processing programs therein.

When the data transmitting/receiving unit 903 receives, from the user device, a content certificate ID recorded in the content certificate further recorded in an information recording medium and which corresponds to content recorded in the information recording medium inserted into the user device, the data retrieving unit 902 searches a database 905 for the pieces of content information relating to the content specified on the basis of the content certificate ID and obtains the pieces of content information from the database 905. Furthermore, the data transmitting/receiving unit 903 transmits the pieces of content information obtained using the data retrieving unit 902 to the user device.

The data retrieving unit 902 obtains, from the database 905, as the pieces of content information, pieces of data such as a music title, a work title, and a CD jacket picture, which relate to the content recorded in the information recording medium loaded in the user device, data (subtitle data) reproduced along with the content recorded in the information recording medium, and copy permission information which is information which allows copy of the content recorded in the information recording medium to another recording medium. The data transmitting/receiving unit 903 transmits the pieces of content information to the user device. Note that although the reproducing apparatus and the server including the database are separately described with reference to FIGS. 17 and 18, respectively, the reproducing apparatus may include a database in advance. Alternatively, another configuration in which a database is obtained from the server and the reproducing apparatus searches the database for pieces of content information relating to content to be reproduced using the content certification ID may be employed.

For example, in a case where the reproducing apparatus includes a database, the reproducing apparatus is configured as an information processing apparatus which includes a data analyzer, a data retrieving unit, and a data output unit. In this case, the data analyzer reads a content certificate which is recorded in an information recording medium and which corresponds to content recorded in the information recording medium and which obtains a content certificate ID from the content certificate. The data retrieving unit searches a table for pieces of content information relating to the content specified using the content certificate ID which is analyzed using the data analyzer. The data output unit outputs the pieces of content information relating to the content.

The present invention is described with reference to the embodiments described above. However, it should be understood by those skilled in the art that various modifications, combinations, sub-combinations and alterations may occur depending on design requirements and other factors insofar as they are within the scope of the appended claims or the equivalents thereof. That is, the embodiments are merely examples and the present invention is not limited to them. An outline of the present invention will be understood with reference to claims.

Note that the series of processes described herein may be executed using hardware, software, or a combination of hardware and software. In a case where the series of processes is executed using software, a program including a processing sequence is installed in a memory included in dedicated hardware of a computer to execute the series of processes, or the program is installed in a general computer capable of executing various processes to execute the series of processes.

For example, the program may be recorded in a hard disc or a ROM (Read-Only Memory) serving as a recording medium in advance. Alternatively, the program may be temporarily or permanently stored (recorded) in a removable recording medium such as a flexible disc, a CD-ROM (Compact Disc Read-Only Memory), an MO (Magneto Optical) disc, a DVD (Digital Versatile Disc), a magnetic disc, or a semiconductor memory. Such a removable recording medium may be provided as so-called package software.

Note that the program may be installed into the computer from the removable recording medium as described above, and in addition, the program may be downloaded via a wireless network from a download site to the computer, or may be downloaded via a LAN (Local Area Network) or the Internet using a wired network to the computer. The computer receives the program thus transmitted and installs the program in a recording medium such as an incorporated hard disc.

The various processes described herein may be executed in a time-series manner in an order of the descriptions of the processes. Alternatively, the various processed may be executed in parallel or individually according to processing capability of an apparatus which executes the processes or as needed. The "system" described herein means a configuration in which a plurality of apparatuses are logical integrated, and is not limited to a configuration in which a plurality of apparatuses having own configurations are stored in one case.

What is claimed is:

1. An information processing apparatus that obtains pieces of content information relating to content recorded in an information recording medium, the information processing apparatus comprising:
- a data analyzing unit configured to read a content certificate which is recorded in the information recording medium and which corresponds to the content recorded in the information recording medium;
- a data transmitting unit configured to transmit a content certificate identifier analyzed using the data analyzing unit to a content information provision server;
- a data receiving unit configured to receive, from the content information provision server, the pieces of content information relating to the content which is specified on the basis of the content certificate identifier; and
- a data outputting unit configured to output the pieces of content information received using the data receiving unit.

2. The information processing apparatus according to claim 1,
wherein the data analyzing unit obtains the content certificate identifier constituted by a combination of a plurality of pieces of identification data recorded in the content certificate.

3. The information processing apparatus according to claim 2,
wherein the data analyzing unit obtains the content certificate identifier constituted by,
an applicant identifier which is an identifier used to specify a provider of the content recorded in the information recording medium or a disc manufacturer which is a manufacturer of the information recording medium, and
a content sequence number which is an identifier corresponding to the applicant identifier and the content recorded in the information recording medium.

4. The information processing apparatus according to claim 1,
wherein the content certificate includes the content certificate identifier, pieces of data including digest values generated from a content hash table, and a digital signature, and
the content certificate identifier and the digital signature are assigned to the content certificate in accordance with a management system provided by a third party.

5. The information processing apparatus according to claim 1,
wherein the data analyzing unit checks validity of the digital signature recorded in the content certificate so as to check validities of the content certificate and the content, and only when the content certificate and the content are determined to be valid or not falsified, obtains the content certificate identifier from the content certificate, and
the data transmitting unit transmits the content certificate identifier.

6. The information processing apparatus according to claim 1, further comprising:
a reproduction controlling unit configured to control reproduction of the content recorded in the information recording medium,
wherein, the data receiving unit receives a content revocation list which is a list of invalid contents from the content information provision server along with the pieces of content information, and
the reproduction controlling unit checks validity of the content recorded in the information recording medium on the basis of the content revocation list, and reproduces the content only when the content is determined to be a valid content.

7. The information processing apparatus according to claim 1,
wherein the data receiving unit receives, as the pieces of content information, pieces of data including a title of the content recorded in the information recording medium from the content information provision server, and
the data outputting unit outputs the pieces of data including the title of the content on a display unit.

8. The information processing apparatus according to claim 1,
wherein the data receiving unit receives, as an additional piece of content information, a piece of data which is to be reproduced along with the content recorded in the information recording medium from the content information provision server, and
the reproduction controlling unit reproduces the content recorded in the information recording medium and the additional piece of content information received from the content information provision server.

9. The information processing apparatus according to claim 1,
wherein the data receiving unit receives, as an additional piece of content information, subtitle data to be reproduced along with the content recorded in the information recording medium from the content information provision server, and
the reproducing control unit reproduces the content recorded in the information recording medium and the subtitle data received from the content information provision server.

10. The information processing apparatus according to claim 1,
wherein the data receiving unit receives, from the content information provision server, copy permission information which allows copying of the content recorded in the information recording medium to another recording medium, and
the reproduction controlling unit copies the content recorded in the information recording medium to the other recording medium only when the reception of the copy permission information is confirmed.

11. An information processing apparatus serving as a server that provides a user device with pieces of content information relating to content recorded in an information recording medium loaded in the user device, the information processing apparatus comprising:
- a data receiving unit configured to receive a content certificate identifier included in a content certificate which is recorded in the information recording medium and which corresponds to the content recorded in the information recording medium;
- a database which includes the content certificate identifier and the pieces of content information which relate to the content specified on the basis of the content certificate identifier, the content certificate identifier being associated with the pieces of content information;
- a data retrieving unit configured to obtain the pieces of content information relating to the content which is specified on the basis of the content certificate identifier received using the data receiving unit; and
- a data transmitting unit configured to transmit the pieces of content information obtained using the data retrieving unit to the user device.

12. The information processing apparatus according to claim 11,
wherein the content certificate includes the content certificate identifier, digest values generated using a content hash table, and a digital signature, and
the content certificate identifier and the digital signature are assigned to the content certificate in accordance with a management system provided by a third party.

13. The information processing apparatus according to claim 11,
wherein the data retrieving unit obtains, as the pieces of content information, pieces of data including a title of the content recorded in the information recording medium from the database, and
the data transmitting unit transmits the pieces of data including the title of the content to the user device.

14. The information processing apparatus according to claim 11,
wherein the data retrieving unit obtains, as an additional piece of content information, a piece of data which is to be reproduced along with the content recorded in the information recording medium from the database, and
the data transmitting unit transmits the additional piece of content information which is to be reproduced along with the content to the user device.

15. The information processing apparatus according to claim 11,
wherein the data retrieving unit obtains, as an additional piece of content information, subtitle data which is to be reproduced along with the content recorded in the information recording medium from the database, and
the data transmitting unit transmits the subtitle data which is to be reproduced along with the content to the user device.

16. The information processing apparatus according to claim 11,
wherein the data retrieving unit receives, from the database, copy permission information which allows copying of the content recorded in the information recording medium to another recording medium, and
the data transmitting unit transmits the copy permission information to the user device.

17. A non-transitory computer-readable recording medium storing a computer program which when executed by a computer, causes the computer to perform a method of obtaining pieces of content information relating to content recorded in an information recording medium, the method comprising:
reading a content certificate which is recorded in the information recording medium and which corresponds to content recorded in the information recording medium;
obtaining a content certificate identifier from the content certificate using a data analyzing unit;
transmitting, using a data transmitting unit, the content certificate identifier which has been analyzed using the data analyzing unit to a content information provision server;
receiving, using a data receiving unit, the pieces of content information which are related to the content specified on the basis of the content certificate identifier and which are transmitted from the content information provision server; and
outputting, using a data outputting unit, the pieces of content information which have been received using the data receiving unit.

18. An information processing apparatus that obtains pieces of content information relating to content recorded in an information recording medium, the information processing apparatus comprising:
a data analyzing unit configured to read a content certificate which is recorded in the information recording medium and which corresponds to the content recorded in the information recording medium, and configured to obtain a content certificate identifier from the content certificate;
a retrieving unit configured to search a table for the pieces of content information relating to the content specified using the content certificate identifier which has been analyzed using the data analyzing unit; and
a data outputting unit configured to output the pieces of content information.

19. The information processing apparatus according to claim 18,
wherein the content certificate includes the content certificate identifier, digest values generated using a content hash table, and a digital signature, and
the content certificate identifier and the digital signature are assigned to the content certificate in accordance with a management system provided by a third party.

20. An information processing method for obtaining pieces of content information relating to content recorded in an information recording medium, the information processing method comprising:
reading a content certificate which is recorded in the information recording medium and which corresponds to the content recorded in the information recording medium, and obtaining a content certificate identifier from the content certificate using a data analyzing unit;
searching, using a data retrieving unit, a table for the pieces of content information relating to the content specified using the content certificate identifier which has been analyzed using the data analyzing unit; and
outputting, using a data outputting unit, the pieces of content information which have been searched using the data retrieving unit.

* * * * *